United States Patent [19]
Rudeen

[11] Patent Number: 5,945,670
[45] Date of Patent: *Aug. 31, 1999

[54] OPTICAL SYSTEM FOR DATA READING HAVING LARGE DEPTH OF FIELD

[75] Inventor: Robert W. Rudeen, Eugene, Oreg.

[73] Assignee: Spectra-Physics Scanning Systems, Inc., Eugene, Oreg.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/858,597

[22] Filed: May 19, 1997

Related U.S. Application Data

[63] Continuation of application No. 08/475,757, Jun. 7, 1995, Pat. No. 5,641,958, which is a continuation of application No. 08/164,300, Dec. 7, 1993, Pat. No. 5,479,011, which is a continuation-in-part of application No. 07/992,932, Dec. 18, 1992, Pat. No. 5,347,121.

[51] Int. Cl.⁶ ..................................................... G06K 7/10
[52] U.S. Cl. ........................... 250/235; 250/568; 235/472
[58] Field of Search .......................... 250/235, 555–557, 250/566, 568, 234, 236; 235/462, 467, 472; 359/370

[56] References Cited

U.S. PATENT DOCUMENTS

| | | | |
|---|---|---|---|
| 2,811,081 | 10/1957 | Praeger | 88/57 |
| 3,004,470 | 10/1961 | Rühle | 88/57 |
| 3,928,759 | 12/1975 | Sansome | 250/568 |
| 3,995,166 | 11/1976 | Hobart et al. | 250/566 |
| 4,333,006 | 6/1982 | Gorin et al. | 235/457 |
| 4,335,302 | 6/1982 | Robillard | 235/462 |
| 4,367,009 | 1/1983 | Suzki | 350/6.5 |
| 4,407,569 | 10/1983 | Piller et al. | 350/509 |
| 4,415,224 | 11/1983 | Dickson | 350/3.71 |
| 4,560,862 | 12/1985 | Eastman et al. | 235/467 |
| 4,576,441 | 3/1986 | Kubick | 350/355 |
| 4,675,531 | 6/1987 | Clark et al. | 250/568 |
| 4,678,288 | 7/1987 | Lonsdale et al. | 350/432 |
| 4,733,064 | 3/1988 | Ishikawa | 250/201.4 |
| 4,748,316 | 5/1988 | Dickson | 235/454 |
| 4,758,070 | 7/1988 | Nishimoto | 350/379 |
| 4,786,798 | 11/1988 | Lonsale et al. | 250/216 |
| 4,799,164 | 1/1989 | Helleckson et al. | 235/467 |

(List continued on next page.)

FOREIGN PATENT DOCUMENTS 0 042 946  6/1982  European Pat. Off. .

OTHER PUBLICATIONS

CX–7051 Reader/Printer Terminal Service Manual, CX Systems, Seattle, WA; pp. i, ii, 1–2, 20–23, 32–33 (May 1, 1982).

MS–1000 Technical Manual, Microscan, Seattle, WA (approx. 1982).

MS–1000 brochure for High Speed Miniature Laser Scanner, Microscan, Seattle, WA (Nov. 82).

IBM Technical Disclosure Bulletin, vol. 24, No. 9 (Feb. 1982) entitled "Time Multiplexed Two–Beam Scanner" by E. C. Brookman.

*Primary Examiner*—Stephone Allen
*Attorney, Agent, or Firm*—Lyon & Lyon LLP

[57] ABSTRACT

An optical system and method for data reading in which a light source generates an optical beam directed toward an object to be read and a variable aperture mechanism positioned in the outgoing light path establishes at least two separate focal planes. The variable aperture device may comprise a variable aperture system in which the size of the aperture is selectively varied about a range within the diffractive limit of the light beam. A preferred aperture mechanism is an electronically actuable mechanism with no moving parts which may include a liquid crystal aperture with one or more aperture regions which are selectively or consecutively activated. The optical system therefore establishes two or more separate waist locations from a single light source resulting in greater depth of field or multiple depths of field.

33 Claims, 11 Drawing Sheets

U.S. PATENT DOCUMENTS

| | | | |
|---|---|---|---|
| 4,808,804 | 2/1989 | Krichever et al. | 235/462 |
| 4,818,886 | 4/1989 | Drucker | 250/566 |
| 4,820,911 | 4/1989 | Arackellian et al. | 235/467 |
| 4,831,275 | 5/1989 | Drucker | 250/566 |
| 4,833,314 | 5/1989 | Pepper et al. | 250/201 |
| 4,843,222 | 6/1989 | Hochgraf | 235/470 |
| 4,861,975 | 8/1989 | Kino et al. | 250/201 |
| 4,916,318 | 4/1990 | Iima | 250/268 |
| 4,939,355 | 7/1990 | Rando et al. | 235/467 |
| 4,946,234 | 8/1990 | Sasada et al. | 350/6.6 |
| 4,947,413 | 8/1990 | Jewell et al. | 378/34 |
| 5,016,981 | 5/1991 | Peppers et al. | 350/314 |
| 5,080,456 | 1/1992 | Katz et al. | 359/214 |
| 5,081,364 | 1/1992 | Wike, Jr. | 250/555 |
| 5,111,343 | 5/1992 | Harrigan | 359/888 |
| 5,121,378 | 6/1992 | Hirose et al. | 369/112 |
| 5,170,277 | 12/1992 | Bard et al. | 359/210 |
| 5,200,597 | 4/1993 | Eastmann et al. | 235/455 |
| 5,208,701 | 5/1993 | Maeda | 359/574 |
| 5,210,398 | 5/1993 | Metlitsky | 235/462 |
| 5,233,170 | 8/1993 | Metlisky et al. | 235/462 |
| 5,340,971 | 8/1994 | Rockstein et al. | 235/472 |
| 5,347,121 | 9/1994 | Rudeen | 250/235 |
| 5,386,105 | 1/1995 | Quinn et al. | 235/462 |
| 5,438,187 | 8/1995 | Reddersen et al. | 235/462 |
| 5,468,951 | 11/1995 | Knowles et al. | 235/472 |
| 5,479,011 | 12/1995 | Rudeen et al. | 250/235 |
| 5,641,958 | 6/1997 | Rudeen | 250/235 |
| 5,663,549 | 9/1997 | Katz et al. | 235/462 |

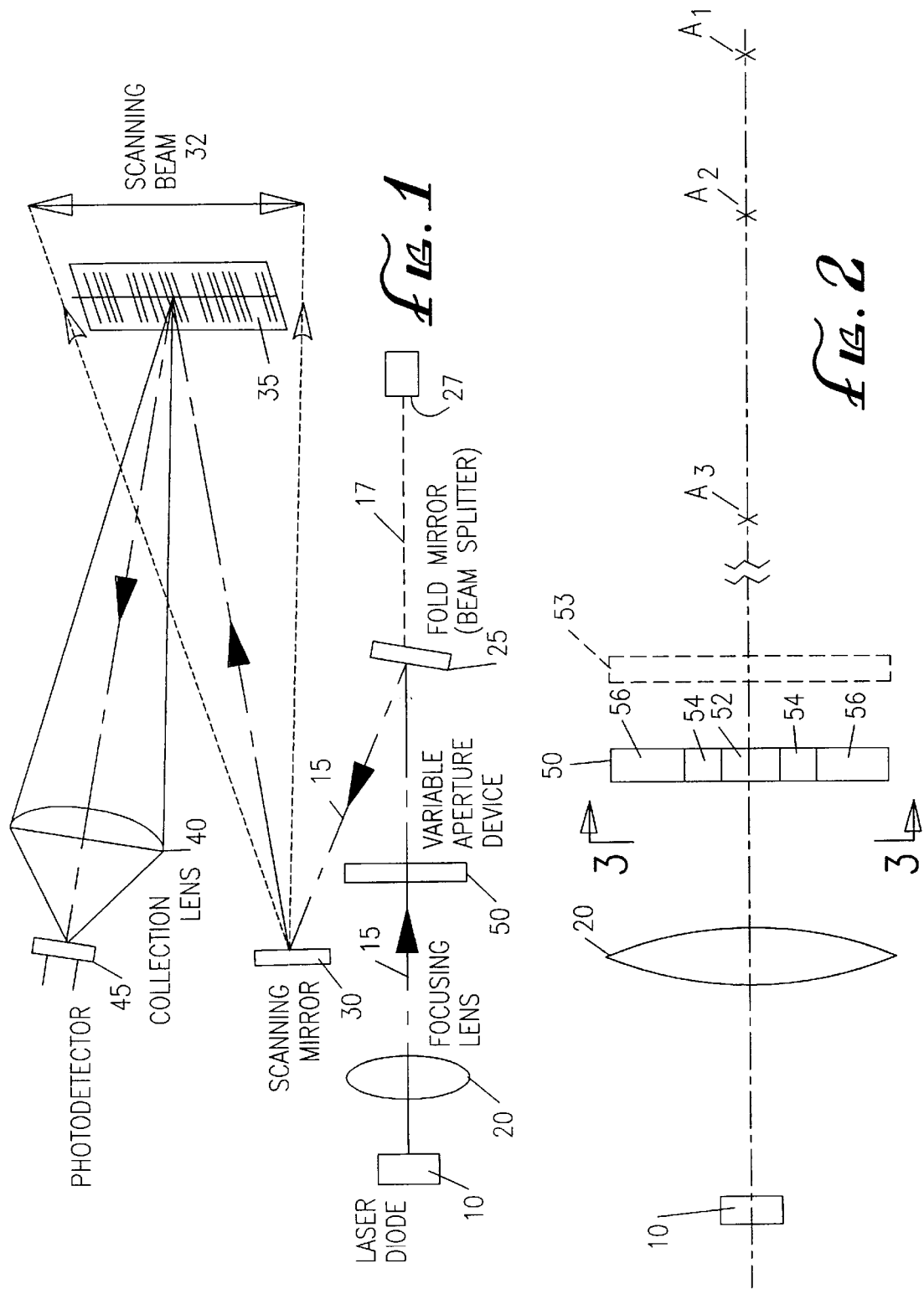

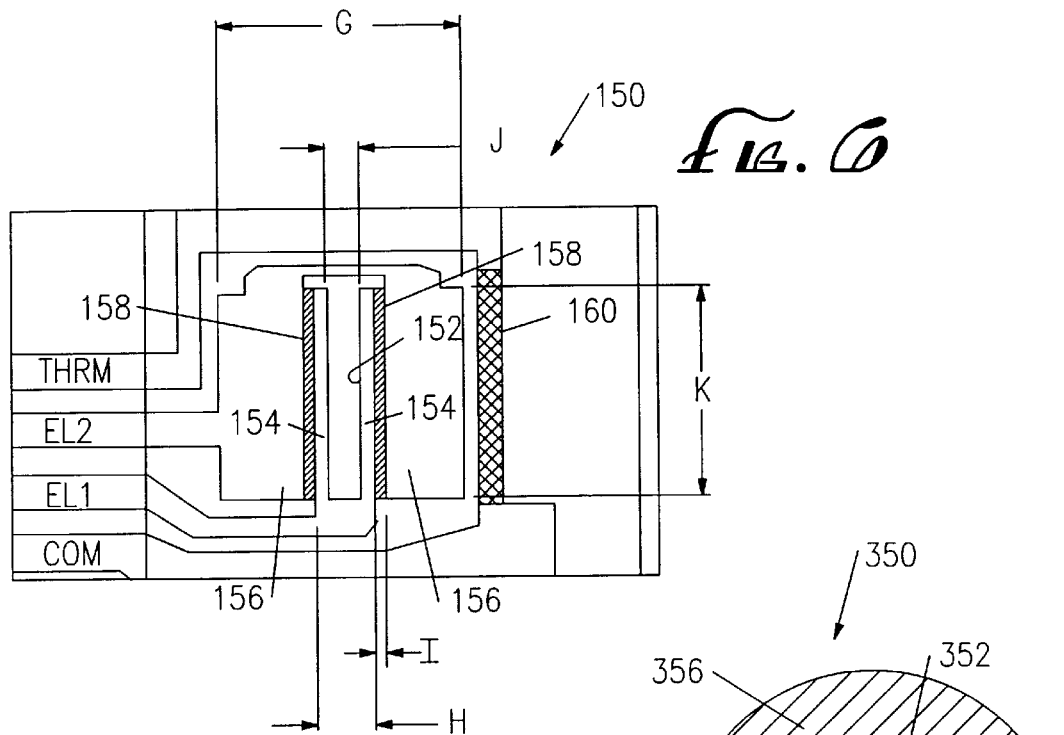
FIG. 6
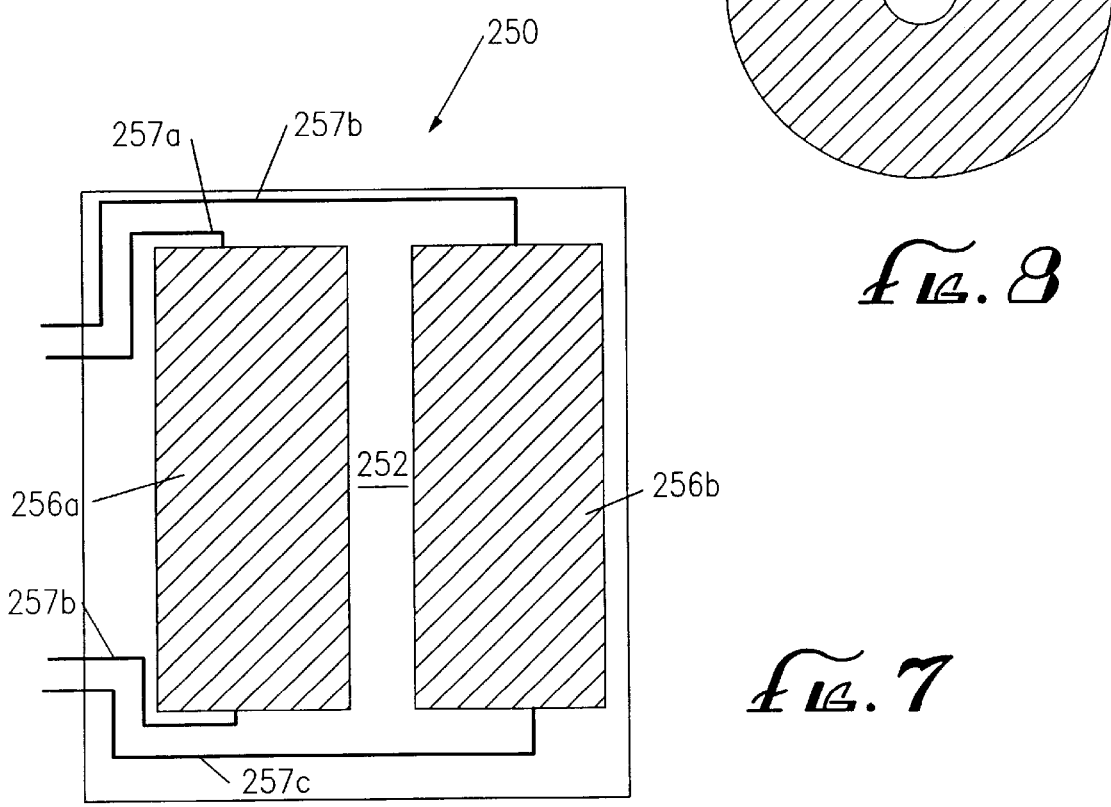
FIG. 8
FIG. 7

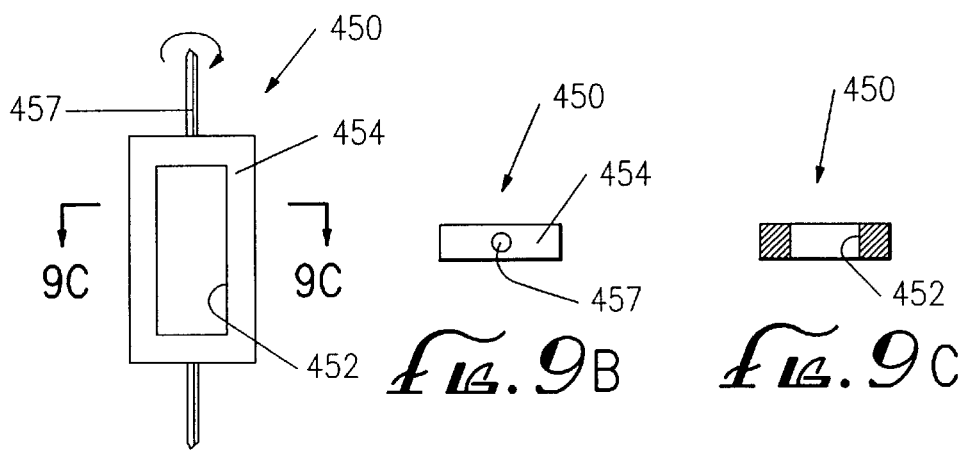
FIG. 9A
FIG. 9B
FIG. 9C
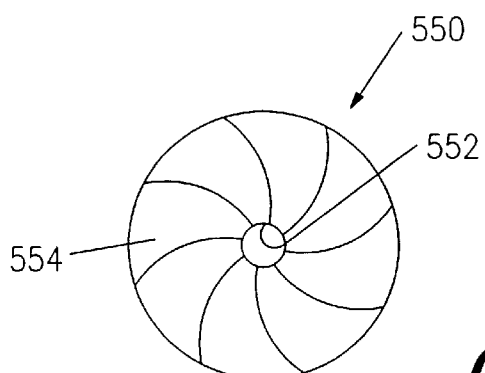
FIG. 10
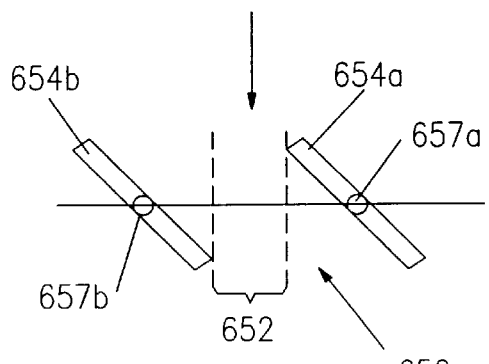
FIG. 11
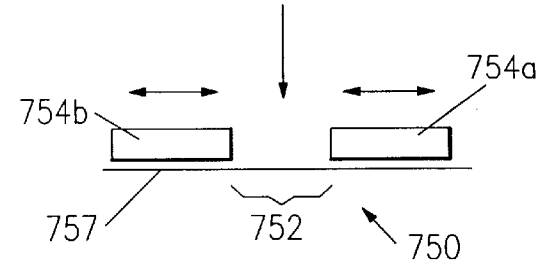
FIG. 12

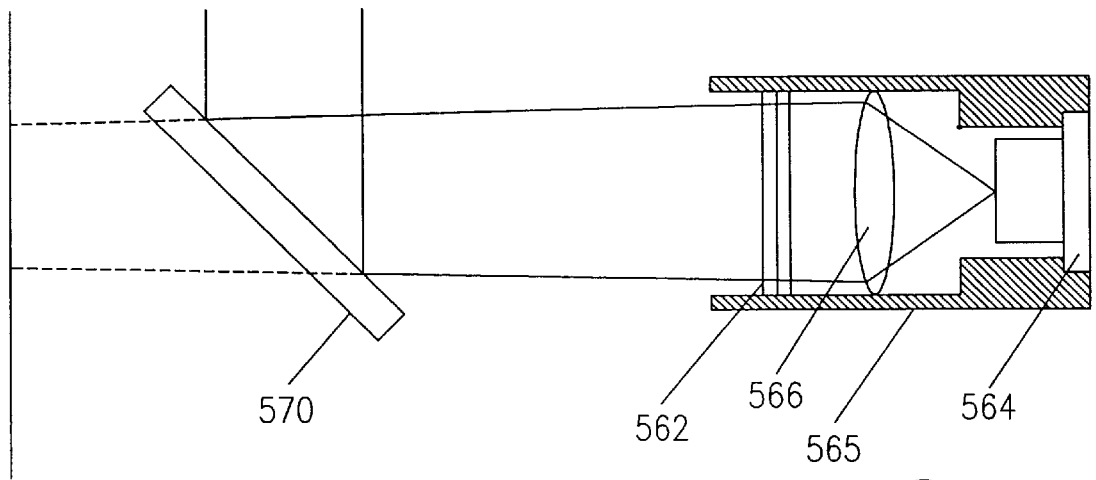
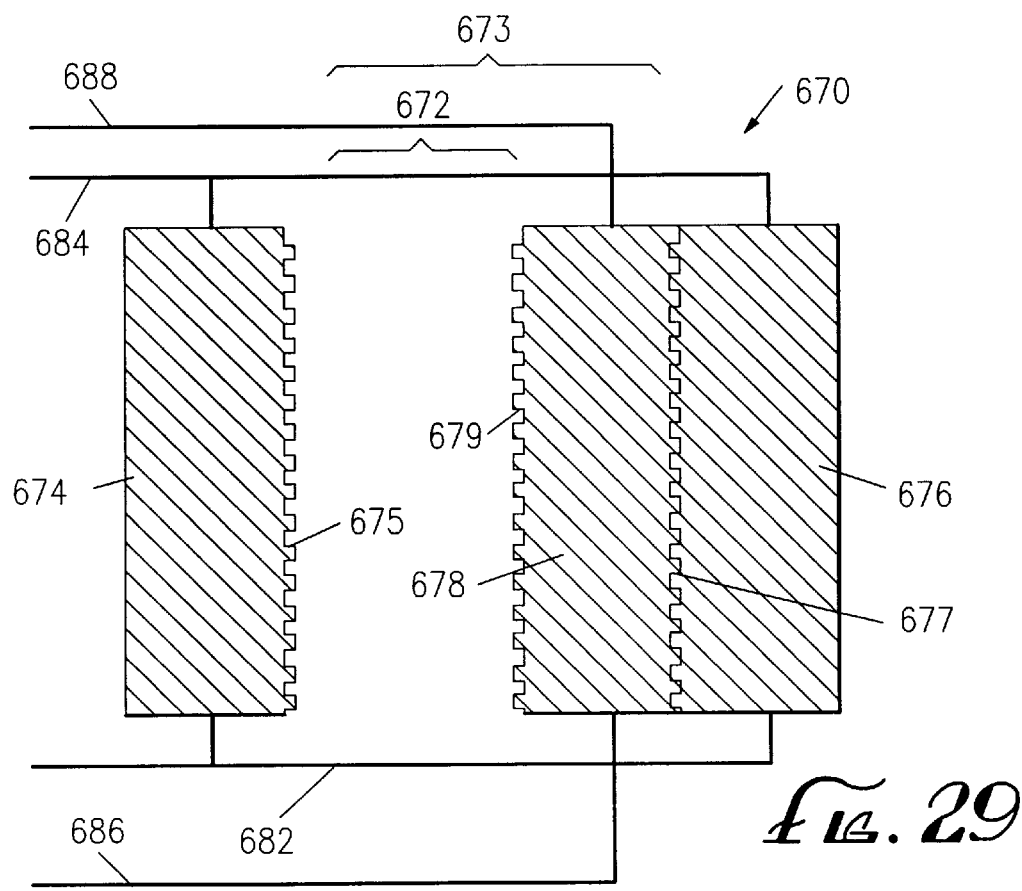

OPTICAL SYSTEM FOR DATA READING HAVING LARGE DEPTH OF FIELD

RELATED APPLICATION DATA

This is a continuation of application Ser. No. 08/475,757 filed Jun. 7, 1995, now U.S. Pat. No. 5,641,958, which is a continuation of Ser. No. 08/164,300 filed Dec. 7, 1993, now U.S. Pat. No. 5,479,011, which is a continuation-in-part application of Ser. No. 07/992,932 filed Dec. 18, 1992, now U.S. Pat. No. 5,347,121.

BACKGROUND OF THE INVENTION

The field of the present invention relates to data reading systems and particularly to an optical system having an expanded depth of field. The invention is especially suitable for use with a symbol scanning system for reading bar codes such as those found on consumer products, for example the UPC code. The invention is suitable for stationary or hand-held scanners.

Bar code scanners, as any optical system, depend upon focused optics for effective and accurate performance. Typical bar code scanners employ a source of coherent light from a laser or laser diode with the light scanned in various directions across a window. Other scanners using non-coherent light sources have also been suggested such as disclosed in U.S. Pat. No. 4,335,302.

In a detection system such as a bar code scanning device employing a focusing lens, a light source such as a laser, laser diode, or non-coherent light source (e.g. light emitting diode) emits light which passes through and is focused by the focusing lens. The object containing the bar code is passed through the focused beam and if the bar code is sufficiently close to the beam focal point, reflected light from the bar code may be detected resulting in a successful scan.

As known by one skilled in the art, a focal point is typically not a discrete point but may be referred to as a "waist" which is the position along the beam axis where the "cone" of light from the light source reaches a minimum spot size, usually as measured in a direction parallel to the direction of spot motion.

A problem arises when the bar code or object being scanned does not fall sufficiently close to the focal point or waist, that is when the beam spot is too large to successively read a symbol. By way of example, in a supermarket checkout application, a product bearing a UPC bar code label is passed at a certain distance in front of the window of a checkout scanner. The checkout scanner is designed with a scanning beam with a waist of a given diameter positioned at a certain distance from the window where the bar code is expected to pass. The checkout clerk must become familiar with the proper distance to pass the object in front of the window, that is, the bar code must pass sufficiently close to the scanner focal point or waist (i.e. within its depth of field) in order to achieve a successful scan.

However, in some applications, it may be desirable for the scanning device to function over a range of distances. There have been several suggestions on how to increase the depth of field or selectively choose a depth of field available for a particular scanner. In one system, a focusing lens is designed with an axially movable lens element (such as a zoom lens) to permit changing of the position of the focal point. Such systems require complicated mechanical lens adjustment and/or may require the user to manually make focusing adjustments.

U.S. Pat. No. 4,808,804 discloses mechanical mechanisms for varying the working distance and the beam spot size. In systems as disclosed in U.S. Pat. No. 4,818,886, the position of the detector or the light source itself is moved changing the object distance. It is desirable to eliminate the need for focus adjustment either by mirror, lens, or source position adjustment and be able to achieve a wide range or variable range of waist location.

Another attempt at providing multiple depths of field is described in U.S. Pat. No. 4,560,862 which uses a rotatable optical polygon mirror having a plurality of facets, each mirror facet being of a different curvature. As the polygon mirror rotates, a different mirror facet reflects the beam from the light source along an optical path, each mirror facet providing a corresponding focal plane. The device requires multiplexing the signal to read the signal received from the various focal planes. Since the rotating polygon mirror also scans the outgoing beam, the device may also not be readily compatible with existing scanner designs and only allows a certain number of discrete focal points (one focal point for each mirror facet). Moreover, changing between selected sets of focal points would require replacing mirror facets or making some other complicated hardware adjustment or modification.

SUMMARY OF THE INVENTION

The present invention relates to an optical system and method for data reading. The system includes (1) a light source which generates an optical beam directed toward an object, (2) a focusing system and (3) a variable aperture optical element disposed in the outgoing optical path. The aperture size is smaller than the diffractive limit of the optical beam. Being smaller than the diffractive limit means that the aperture impinges on the optical beam enough so as to affect the beam propagation in accordance with diffraction theory. The waist position is then changed by varying the effective aperture size. In a preferred embodiment, the variable aperture optical element is located downstream of the focusing lens and comprises a plurality of liquid crystal devices such as an LCD (Liquid Crystal Display) panels disposed along one dimension forming a desired gate width. As the liquid crystal devices or panels are selectively activated, the width of the gate is correspondingly increased or decreased. When the light beam is focused to a waist at a given distance from the focusing lens, this waist may be moved closer to the focusing lens by decreasing the gate width size.

BRIEF DESCRIPTION OF THE DRAWINGS

FIG. 1 is a schematic diagram illustrating an optical system according to the present invention;

FIG. 2 is a diagrammatic top view of a portion of the optical system of FIG. 1 illustrating an LCD embodiment;

FIG. 6 is a detailed scale view of an alternate LCD gate element showing preferred dimensions;

FIG. 7 is a diagrammatic view of alternate LCD gate element of a single rectangular panel pair;

FIG. 8 is a diagrammatic view of alternate LCD element of a round iris configuration;

FIG. 9A is a diagrammatic view of alternate aperture element comprised of a rotating aperture;

FIG. 9B is a top plan view of the aperture element of FIG. 9A;

FIG. 9C is a cross sectional view of the aperture element of FIG. 9A taken along line 9C—9C;

FIG. 10 is a diagrammatic view of alternate mechanical aperture element of a round iris configuration;

FIG. 11 is a diagrammatic view of alternate mechanical aperture element comprised of a pivoting shutter configuration;

FIG. 12 is a diagrammatic view of alternate mechanical aperture element comprised of a sliding shutter configuration;

FIG. 25 is a schematic drawing of a preferred integral laser diode and focusing system;

FIG. 29 diagrammatically illustrates an aperture element with a jagged edge.

DESCRIPTION OF THE PREFERRED EMBODIMENT

Figure 3:
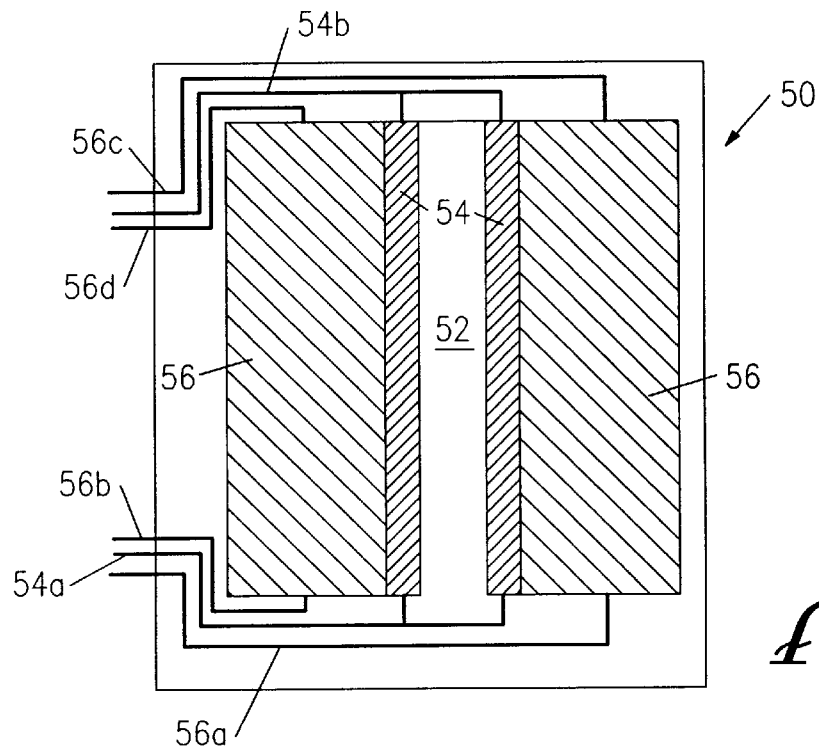
FIG. 3 is a detailed front elevation view of the LCD gate element of FIG. 2.

The preferred embodiments will now be described with reference to the drawings. To facilitate description, any numeral identifying an element in one figure will represent the same element in any other figure.

FIG. 1 is a schematic diagram of an optical system such as that which may be employed by the present invention. A light source illustrated as a laser diode 10 emits light 15 being aimed at the desired target shown as the UPC bar code 35. Light 15 from the laser diode 10 is passed through focusing optics, illustrated in this embodiment as a focusing lens 20. The focused beam 15 is then passed through an aperture device 50. The portion of the beam 15 which passes through the aperture device 50 is reflected off a fold mirror 25 and is then directed toward a scanning mechanism shown in this embodiment as an oscillating mirror 30. As the oscillating mirror 30 pivots, the beam scans over a scanning beam range 32 along the bar code 35.

Light reflected or scattered off the bar code 35 is collected by a suitable collection system shown in this embodiment as being focused by a collection lens 40 and detected by the photodetector 45. The optics of the optical system are constructed such that the focusing lens 20 achieves a waist at a distance from the system at or near the anticipated furthest position of the targeted bar code 35.

Though a preferred scanning mechanism and collection system have been described, any suitable scanning mechanism or collection system may be utilized in the present optical system. As for light sources, the light source 10 is preferably a laser diode, but may be any suitable light source including: a coherent light source such as a laser or laser diode, a non-coherent light source such as a light emitting diode, or combinations thereof. The focusing system may be comprised of one or more optical elements selected from the group consisting of: spherical, Fresnel and aspheric lenses or mirrors, holographic optical elements, and combinations thereof.

To clarify terminology, as used herein when referring to a scanner, the resolving axis shall refer to the axis of the spot along the scanning direction. The non-resolving axis shall refer to the direction perpendicular to the scanning direction.

FIGS. 1–2 illustrate the aperture device 50 positioned downstream of the focusing lens 20 between the focusing lens 20 and the fold mirror 25. The aperture device 50 is preferably positioned downstream of the focusing lens 20 so that the beam 15 is converging as it passes through the aperture. The variable aperture device may however be located at other positions such as between the light source 10 and the focusing lens 20 or between the fold mirror 25 and the scanning mirror 30. If the aperture device is to be positioned on the light source side of the focusing lens 20, it is preferred that the device be located adjacent the focusing lens (as opposed to near the source 10).

Essentially, when control of the spot size in the resolving axis is desired (control of the waist position in the non-resolving axis is described below) the aperture mechanism 50 is preferably on the light source side of the scanning mirror 30. Alternately, the variable aperture mechanism 50 may be incorporated into the scanning mirror 30 itself, oscillating therewith.

In the configuration where the aperture mechanism were positioned on the target side of the scanning mirror, the shape of the beam could be manipulated for different parts of the scan, the aperture mechanism having a more complex structure, for example a series of apertures.

FIGS. 2–5 illustrate a preferred construction for the aperture mechanism 50. The aperture mechanism 50 has a rectangular central aperture 52 which is a light transmissive element such as clear glass. The width of the aperture 52 is arranged parallel to the scanning plane of the scanning beam 32, that is, in the resolving axis (referring to FIG. 2, the beam would scan in a plane parallel to the page). The aperture mechanism 50 has a first pair of transmissive LCD elements 54, 54 (the LCD pair comprising an LCD region which defines an aperture therebetween) symmetrically positioned on either side of the central aperture 52 and a second pair of transmissive LCD elements 56, 56 on either side of the first pair of transmissive LCD elements 54, 54. Both sets of LCD elements 54, 56 are mounted on a suitable glass substrate 51. In some cases, as described below, the aperture may be non-symmetric or offset, placed in such a way as to block one side of the beam more than the other. This offset arrangement may minimize sidelobes in the beam profile that occur as a result of near-field diffraction as will be described in more detail below.

When an LCD is not energized, the polarization of light passing through it is rotated 90°. A polarizer 53 is placed beyond the LCD and is oriented 90° to the initial light polarization. This construction allows the light to pass through with minimum absorption. The polarizer may be a sheet polarizer (a sheet of polarizing material), a polarizing beam splitter, a polarization-dependent mirror, or any other suitable optical device that keeps light polarized along one plane from continuing through the optical device while allowing light polarized along the orthogonal plane to continue through the optical device. It is not required that the polarizer be in close vicinity to the liquid crystal device, however it must be on the side of the LCD opposite to the light source. For example, the polarizer may be incorporated into the fold mirror 25 or the scanning mirror 30. It is conceivable that the polarizer may be incorporated into rotating optical polygon scanning mirror, but such a configuration would not be preferred. In one preferred embodiment, the fold mirror 25 may comprise a polarizing beam splitter (incorporating the polarizer 53 therein) in which the polarized (aperture) light is reflected and the remainder beam portion 17 passes through the element 25 to an alternate device 27. The remainder beam portion 17 may serve an alternate function such as an aiming beam, a secondary scanning beam, a timing beam, an illuminator beam, or a feedback signal beam, or some other suitable function.

When the LCD is energized, the light polarization is no longer rotated. If polarized light is being passed through the LCD panels, the light polarization is rotated by 90° back to the original polarization when the LCD is energized which in combination with the downstream polarizer inhibits the passage of light therethrough. In the application where the light source 10 is a polarized laser or laser diode, the light impacting the LCD is already about 99% polarized. The LCD regions are then arranged to inhibit passage of light therethrough when energized. In the application where a non-coherent light source is used (or to further ensure desired polarization), a polarizer is also placed upstream of the LCD module and the areas where the LCD is activated, which in combination with the downstream polarizer will not allow light through.

The net effect of the aperture mechanism 50 is to have three separate foci $A_1$, $A_2$, and $A_3$ formed from a single axis of light merely by activating the respective pair of LCD regions or panels 54, 56 of the aperture mechanism 50. Specifically, when none of the pairs of LCD regions 54, 56 are energized, the width of the effective aperture is A and the focus waist will then appear at point $A_1$. By energizing the outer LCD panels 56, 56 (preferably simultaneously), the width of the effective aperture is reduced to a dimension B. Since the dimension B is within (i.e. smaller than) the diffractive limit of the beam 15, the focus waist will now appear at point $A_2$. Subsequently, by also energizing the inner LCD panels 54, 54 and the outer LCD panels 56, 56, the width of the effective aperture is further reduced to a dimension C and the focus waist will now appear at point $A_3$.

Figure 4:
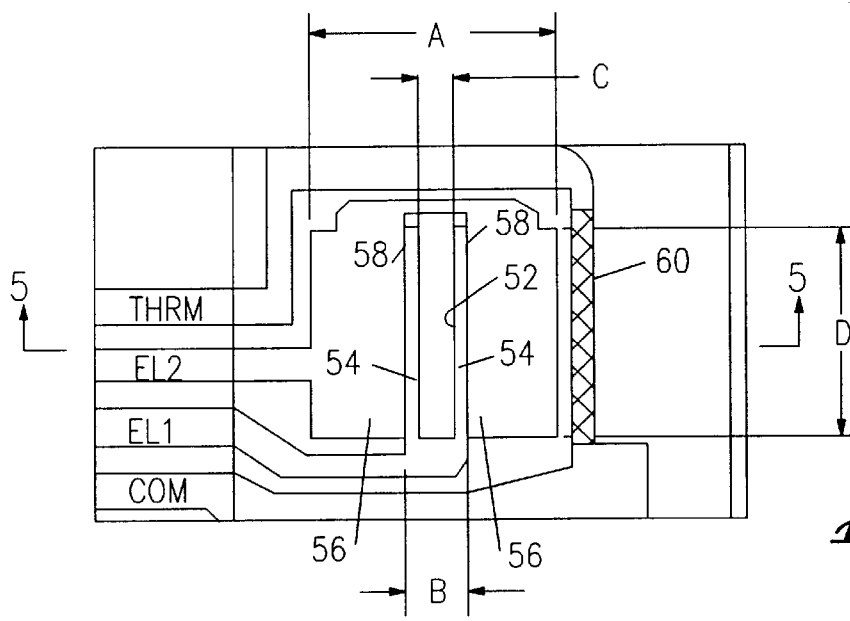
FIG. 4 is a detailed scale view of the LCD gate element of FIG. 3 showing preferred dimensions.
Figure 5:
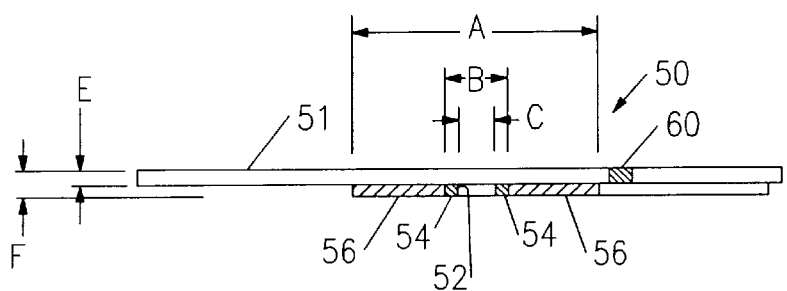
FIG. 5 is a cross sectional view of the LCD gate element of FIG. 4 taken along line 5—5.

The following are a set of preferred dimensional values for the elements of aperture mechanism 50 set forth in FIGS. 4–5:

A=0.200 in. (5.1 mm)—the overall aperture outside of the LCD panels 56, 56.

B=0.070 in. (1.8 mm)—the aperture defined between the LCD panels 56, 56.

C=0.035 in. (0.89 mm)—the aperture defined between the LCD panels 54, 54.

D=0.17 in. (4.3 mm)—the height of the active LCD cell.

E=0.043 in. (1.1 mm)—the thickness of the glass substrate 51.

F=0.086 in. (2.2 mm)—the total thickness of the aperture 50.

In data reading applications such as bar code scanning systems, this design provides several advantages. A system with three discrete waist positions $A_1$, $A_2$, and $A_3$ would have three different depths of field regions (one for each focal position) resulting in an overall greater depth of field than a conventional system with only a single focal position. The system is electrically controllable with no moving parts. Since the LCD regions are readily actuated, such a design is simple and relatively inexpensive and does not require complicated movable focusing elements.

The specific design of the variable aperture mechanism 50 will depend on various factors for a particular application including the number of waist positions desired, the type of light source, light source intensity distribution, target size and type, and external factors such as the desired distances to the focal points, spot diameters at the waist positions, aperture stops included outside of the lens system, lens diameter(s), and cost constraints. The example of FIGS. 3–4 is merely a preferred example which may be particularly useful in a handheld bar code scanner. In one example tested (using a mechanical aperture of a construction similar to the one in FIG. 12 described below), without the variable aperture mechanism 50, the unmodified scanner would have the capability of reading a 13 mil (330 micron) labels over a range of 30–60 inches (760–1520 mm) whereas with the variable aperture mechanism 50, the scanner could effectively read over a much broader range of 6–60 inches (150–1520 mm).

At first glance it may appear problematic that the addition of an aperture in the light path operates to reduce total light intensity. However, when the aperturing is effected downstream of the focusing lens 20 (referring to FIGS. 1–2) and further than one focal length from the focusing lens, the addition of the aperture moves the waist closer to the focusing lens. Therefore, the light intensity loss due to aperture reduction is compensated for by the nearer waist location actuated by the smaller aperture. The compensation is due to the fact that light intensity varies in proportion to $1/x^2$ (x being the distance from the light source).

If on the other hand the aperturing occurs on the light source side of the focusing lens 20 (i.e. upstream of the focusing lens 20), the addition of an aperture moves the object location further away from the focusing lens. Therefore the aperture not only reduces the light intensity, but the focus distance increase compounds the loss of light intensity. It is therefore preferred that the effective aperture occur downstream of the focusing lens or if located upstream of the focusing lens, it is preferred that the aperture be located at least in close proximity thereto, preferably less than one focal length from the focusing lens. By placing the aperture within one focal length of the lens, no image (of the aperture) is formed. In contrast if the aperture were placed greater than one focal length upstream of the focusing lens, an image of the aperture would be formed and reducing aperture size would shift the image further from the focusing lens. Therefore it is preferred that the aperture 50 be located downstream from a point one focal length upstream of the focusing lens 20. In other words, for a lens 20 having a focal point one focal length upstream (i.e. to the left as viewed in FIG. 2) thereto, it is preferred that the aperture 50 be located downstream (i.e. to the right) of that point but preferably upstream of the scanning mirror 30.

FIG. 25 illustrates a scanner 560 of preferred integral construction in which the liquid crystal element 562 is incorporated into the housing or barrel 565 of the light source shown as a laser diode 564. The beam of laser light from the laser diode 564 is focused by a focusing lens 566 and then is passed through the liquid crystal element 562. In this embodiment, the polarizer is not located adjacent to the liquid crystal element but well downstream at a polarizing beam splitter or polarization dependent mirror 570. Tests have shown that with the downstream polarizer removed, the beam profile is unaffected by the liquid crystal element regardless of whether it is activated or not. The effective aperturing takes place at the polarizer 570. This configuration enables the scanner 560 to be readily constructed with the liquid crystal element 562, focusing lens 566, and laser diode module 564 assembled within the same housing 565 in a unitary structure. The structure may be assembled by the laser diode manufacturer and sealed within the barrel housing 565 providing pre-alignment for the elements and a protective outer structure to safeguard the elements from damage or misalignment during scanner assembly or use. The liquid crystal element 562 may be positioned on either side of the focusing lens 566 as it is the location of the polarizer 570 relative to the focusing lens 566 which is significant.

Though multiple waist positions are often desirable, in certain other configurations, only a single waist position may be desired. The aperture mechanism 50 may provide a preset focal point, set by the manufacturer, the system assembler, or the technician (or alternately the user by actuation of an external switch). In such a system, a single scanner assembly design may be employed and the manufacturer (for example) need only select the appropriate aperture setting corresponding to the desired fixed focal position. Manufacturing costs may be reduced as only a single scanner design need be manufactured without requiring complicated hardware modifications. Further, by allowing easy adjustment of the focal position, the required mechanical tolerances of the other optics may be reduced.

In order to have separately addressable LCD regions, in current technology, a non-active region is required between the LCD regions. As viewed in FIGS. 3–4, the non-active regions 58, 58 (shown only as a dark lines 58, 58 in FIG. 4) separate the inner LCD panels 54, 54 from the outer LCD panels 56, 56. These non-active regions have not shown to create any significant impact on aperturing effects.

FIG. 6 illustrates an alternate LCD aperture element 150 also showing preferred dimensions for the inner LCD panels 154, 154, the outer LCD panels 156, 156, and the central aperture 152. In order to ensure separately addressable LCD regions and to provide for easier construction, a larger non-active region is required between the inner LCD panel regions 154, 154 and the outer LCD panel regions 156, 156. The non-active regions 58, 58 (shown as the cross-hatched strips 158, 158) separate the inner LCD panels 154, 154 from the outer LCD panels 156, 156. The preferred dimensions are as follows:

G=0.200 in. (5.1 mm)—the overall aperture outside of the LCD panels 156, 156.

H=0.070 in. (1.8 mm)—the aperture defined between the LCD panels 156, 156 inside of non-active regions 158, 158.

I=0.005 in. (0.13 mm)—the thickness of the non-active region 158.

J=0.035 in. (0.89 mm)—the aperture defined between the LCD panels 54, 54.

K=0.17 in. (4.3 mm)—the height of the active LCD cell.

Figure 13:
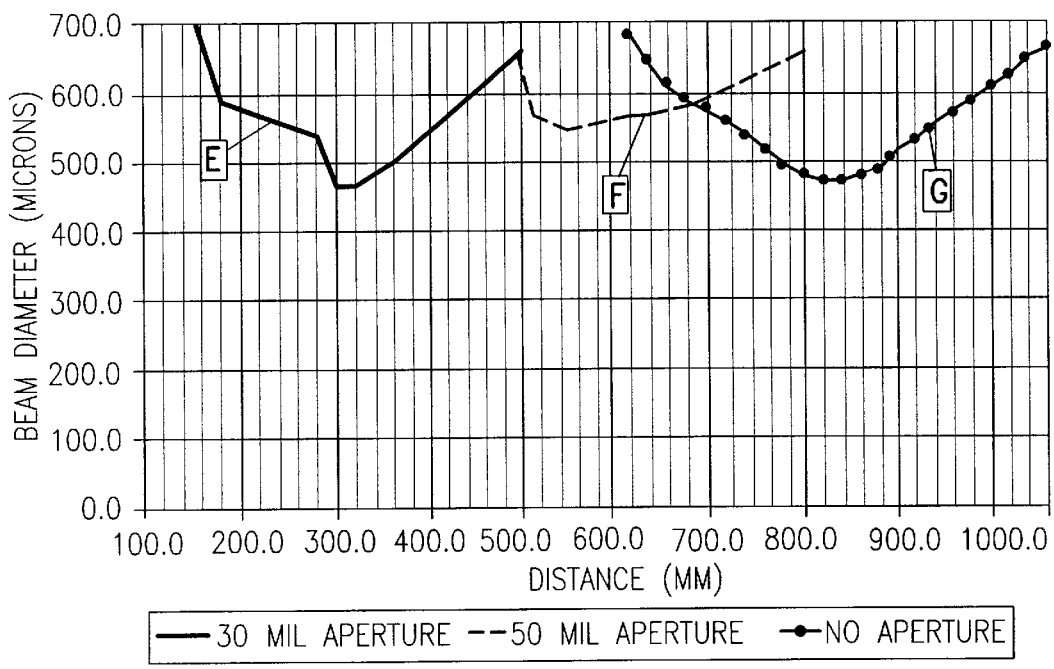
FIG. 13 a graph illustrating plots of example spot diameters for an example multi-width variable focus LCD gate element.

FIG. 13 is a graph of experimental data showing optical performance of one example embodiment of the optical system employing a mechanical aperture which applied the aperture dimensions of the aperture mechanism 50 of FIGS. 2–5. The x-axis shows where a value on the curve is calculated as the distance from the lens in mm. (This is the distance between, for example, aperture mechanism 50 and point $A_3$ in the short focus case of FIG. 2.) The y-axis represents the spot diameter in the resolving axis of a laser beam focused by the system. This spot diameter is expressed in microns (units of $10^{-3}$ mm) and is measured at the width of the focused laser beam where the intensity is $1/e^2$ times as large as at the center of the focused beam.

The graph of FIG. 13 shows three different curves of data. The solid line Curve E represents the change in spot diameter for a laser beam with a wavelength of 670 nm, with a best focus diameter (in the resolving axis) of about 470 microns, the near focal point $A_3$ (when both LCD panels 54, 56 are energized) is located about 300 mm from the aperture. On either side of the best focus, the spot diameter gets larger, as shown in the solid curve.

The dashed line Curve F represents the intermediate focus point $A_2$ created by energizing only the outer LCD panels 56. In this case the focus point $A_2$ has been positioned at about 560 mm and has a minimum spot diameter in the resolving axis of about 560 microns. The dotted line Curve G represents the far focus point $A_1$ created with neither LCD panel 54, 56 energized. In this case, the focus point $A_1$ has been positioned at 850 mm and has a minimum spot diameter in the resolving axis of 480 microns.

To illustrate how this system would extend depth-of-field over a conventional single focus system, an example signal processing system will now be considered. In one kind of signal processing, it may be possible to successfully "decode" signals scanned where the $1/e^2$ spot diameter of the spot is 2.0x as large as the minimum bar width being scanned. Using this assumption as a guideline, a spot 700 microns in diameter would be able to read bar codes with a bar width of 700/2.0 microns, which is 350 microns. If the spot size is 700 microns or smaller, then, it is possible under this signal processing assumption that a scanner could "decode" labels of 350 microns or larger.

Now, drawing a line across curves E, F and G at the 700 micron spot size point, it may be seen that the short focus aperture setting lens element will be able to resolve the 350 micron bar widths over a distance of about 340 mm, or from 160 mm (at the closest point) to a distance of 500 mm (the furthest point). The intermediate aperture setting will be able to resolve the 350 micron bar widths over a distance of about 300 mm, or from 500 mm to 800 mm. The far aperture setting will be able to resolve the 350 micron bar with this over a distance of about 440 mm, or from 620 mm to 1060 mm. Thus by cycling through the three aperture settings, the device may decode the labels of 350 microns or larger from 160 mm to 1060 mm.

FIG. 7 illustrates another alternate LCD aperture mechanism 250 having a single set of LCD panels 256a, 256b defining a central aperture 252. The first LCD panel 256a is connected to a controller (see FIG. 15 below) by connection elements 257a and 257b. The second LCD panel 256b is also connected to the controller by connection elements 257c and 257d. The operation of the LCD aperture mechanism 250 is similar that described of previous LCD aperture embodiments. The aperture mechanism 250 controls only a single aperture region by LCD panels 256a, 256b, preferable activated in unison. This embodiment may be particularly applicable to grey-scaling techniques, described below, to provide a continuously variable or controllable waist position.

Typically it might be expected to place the LCD gate symmetrically at the center of the beam path. The present inventor has recognized that an offset or non-symmetric location may actually be preferred. In many of the laser diodes tested, when aperturing the parallel (low divergence) axis of the beam produced by a laser diode, there is little change to the beam profile as the opening of the gate element is moved across the beam. However, when aperturing the perpendicular (high divergence) axis of the beam produced by a laser diode, the location of the gate opening produces significant changes in the beam profile at the beam waist. Tests have shown that there is significant variation in beam profile of laser diodes even of the same model and specifications.

Figure 18:
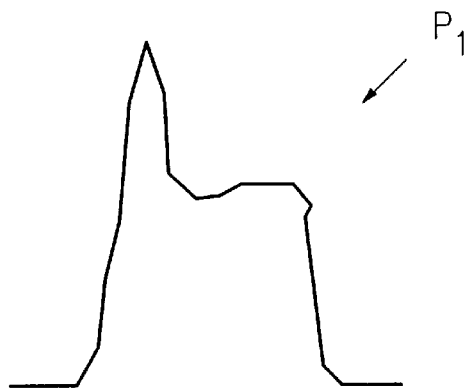
FIG. 18 is a graph of a beam profile of a first sample visible laser diode module.
Figure 19:
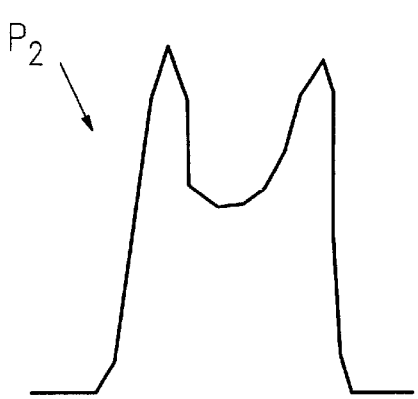
FIG. 19 is a graph of a beam profile of a second sample visible laser diode module.
Figure 20:
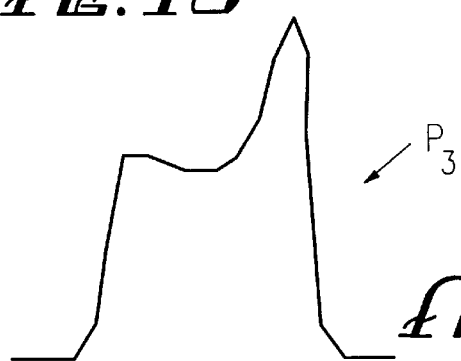
FIG. 20 is a graph of a beam profile of a third sample visible laser diode module.

FIGS. 18–20 are graphs of beam profiles for sample visible laser diodes as measured at a near field 10 inches (25.4 cm) from the light source. In FIG. 18, the beam profile $P_1$ is shown with the intensity of the beam having a higher value on a left edge thereof. In FIG. 19, the beam profile $P_2$ is shown with the intensity of the beam having a higher values on both a left edge and a right edge thereof. In FIG. 20, the beam profile $P_3$ is shown with the intensity of the beam having a higher value on a right edge thereof. The present inventor determined from these beam profiles, $P_1$, $P_2$, $P_3$ that the location of the gate mechanism, being either centered or offset to one side, may alter performance of the waist location shift effected by the gate mechanism.

Figure 21:
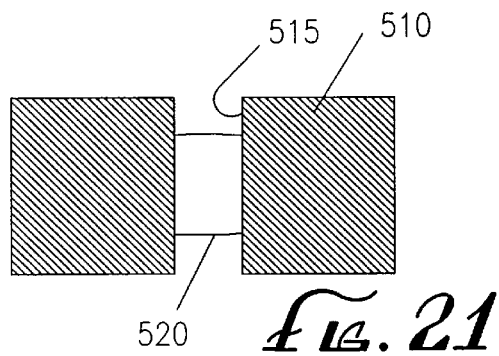
FIG. 21 is a diagrammatic front view of an LCD gate mechanism with a concentrically positioned opening.
Figure 22:
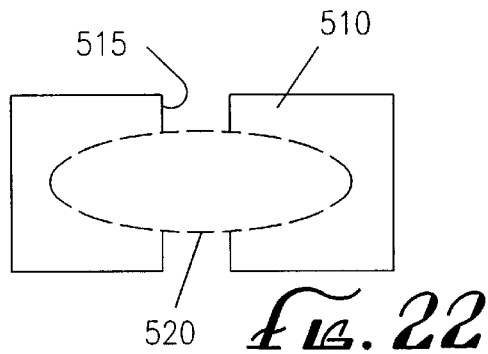
FIG. 22 is a diagrammatic rear view of an LCD gate mechanism of FIG. 21 from the light source side.
Figure 23:
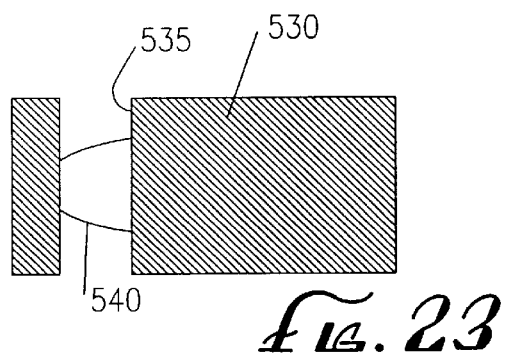
FIG. 23 is a diagrammatic front view of an LCD gate mechanism with an offset opening.
Figure 24:
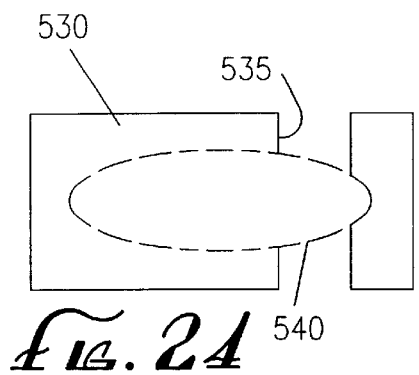
FIG. 24 is a diagrammatic rear view of an LCD gate mechanism of FIG. 23 from the light source side.

FIG. 21 illustrates a gate element 510 from a position looking toward the light source and FIG. 22 illustrates the gate element 510 from the light source side. The LCD gate element 510 is located with its aperture 515 concentrically positioned with the beam 520. Depending on the particular beam profile, it may be desirable to locate the gate mechanism offset to the central axis of the beam. FIGS. 23 and 24 illustrate an offset LCD gate element 530 where the opening 535 is located offset from the central axis of the beam 540, i.e., toward a side edge of the beam 540 the right side as viewed from the light source side.

An offset gate mechanism having its opening offset to one side (say for example the right side as shown in FIG. 24 as viewed from the light source side) of the beam may achieve superior waist adjustment for a first diode tested, but a second diode with a different beam profile may not achieve the same superior results and in fact by locating the opening offset to the opposite side of the beam, superior results may be achieved. It therefore may be desirable to provide specifications for the light source in order to obtain specific beam profiles to ensure superior results when offsetting the gate mechanism to a given side of the beam. However, it is possible that a laser diode manufacturer will not be receptive to such specifications or that the cost of complying with the specifications may be prohibitive.

To conform the laser diode to the optimize multifocal performance it is desirable to understand the mechanism by which the laser diode beam is apertured. It has been determined that the laser diodes may be classified into certain groups of beam profiles. For example, if substantially all of a manufacturer's laser diodes varied between the three profiles of FIGS. 18–20, an assembly may be employed to compensate for variation in beam profile. In the case of a beam profile $P_3$ of FIG. 20 (as viewed from the light source side) with a spike to the right hand side, it is preferred that the gate opening 535 be offset to the right as shown in FIG. 24. In the case of a beam profile $P_2$ of FIG. 18 (as viewed from the light source side), it is preferred that the gate opening 535 be offset to the left. When assembling the scanner components, the LCD gate may be installed with the opening set to the desired side. For example, the gate mechanism may be sidewardly adjustable to position the gate opening at the desired location. Alternately, the gate mechanism having a built-in offset opening may be rotated 180° to reposition the opening to the left or right side (the polarizer would need be located downstream. In a preferred design, the gate mechanism is positioned with a fixed offset and the system is adjusted by rotating the laser diode module 180° to reposition the beam relative to the offset opening. It is preferred that the laser diode and the focusing lens optics be mounted together in the barrel housing and rotated together as a unit.

A suitable testing mechanism may be employed to determine the preferred offset orientation for a particular laser diode. In one such system, the laser diode to be tested is placed in a test fixture with the laser beam then scanned across a series of bars on a clear plastic plate having series of detectors thereon, the plate being located at 22 inches (56 cm) from the laser diode. The scanning beam is tested by passing the beam through an aperture mechanism, first with the opening offset to one side (with a measurement taken) and second with the opening offset to the other side (with a measurement taken). The first and second measurements are then compared to determine the preferred orientation for the laser diode relative to the offset of the opening. The diode may then be suitably tagged or marked. During assembly, the laser diode is installed (relative to the location of the offset) according to the tag or marking so the diode is positioned with its preferred orientation.

Figure 26:
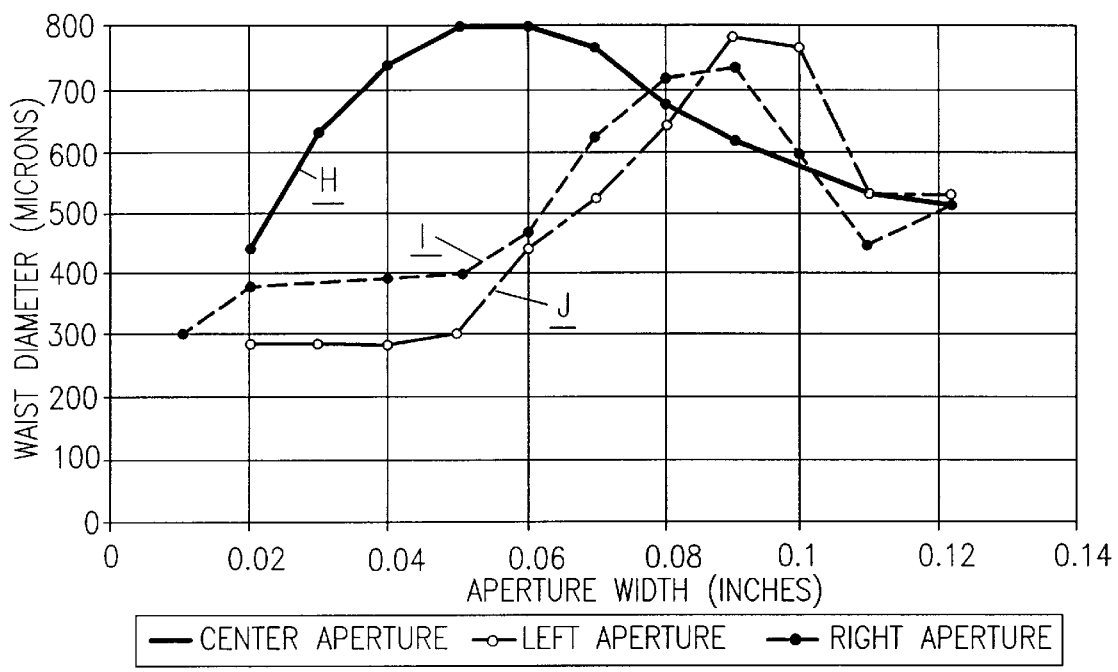
FIG. 26 is a graph illustrating waist diameter as a function of aperture width.

Following the theory of Gaussian Beam Propagation, the waist diameter is inversely proportional to the beam diameter of the lens. By aperturing the beam at the lens, the effective beam diameter is reduced and the resultant waist diameter is increased. This relation is not true when the distance to the waist is also changed. FIG. 26 shows a graph of the waist diameter as a function of aperture width. Curve H is a plot of the illustrates the result of the gate opening being concentric or in the middle of the beam. Curve I illustrates the result of the gate opening being offset to the right side of the beam and Curve J illustrates the result of the gate opening being offset to the left side of the beam. In this case a visible laser diode is being measured along the perpendicular axis. This definition represents the axis which has a larger divergence angle. The perpendicular axis has the peculiar characteristic that the sidelobes are greatly reduced when the beam is apertured from one side or the other rather than in the center. The introduction of sidelobes makes precise definition of the waist size difficult. The graphs H, I, J indicate that in all three cases, the waist diameter does increase as the aperture width is decreased. In the edge aperture cases (I, J) this trend is reversed as the width is decreased to 80%–90% of the beam diameter at the lens. From this point, the waist diameter decreases as a function of the aperture width until it levels off for small apertures. The centered aperture plot H shows that the waist diameter continues to increase until 50% of the beam is cut off by the aperture. After this point, it also exhibits a reduction in the waist diameter as a function of the aperture width.

Figure 27:
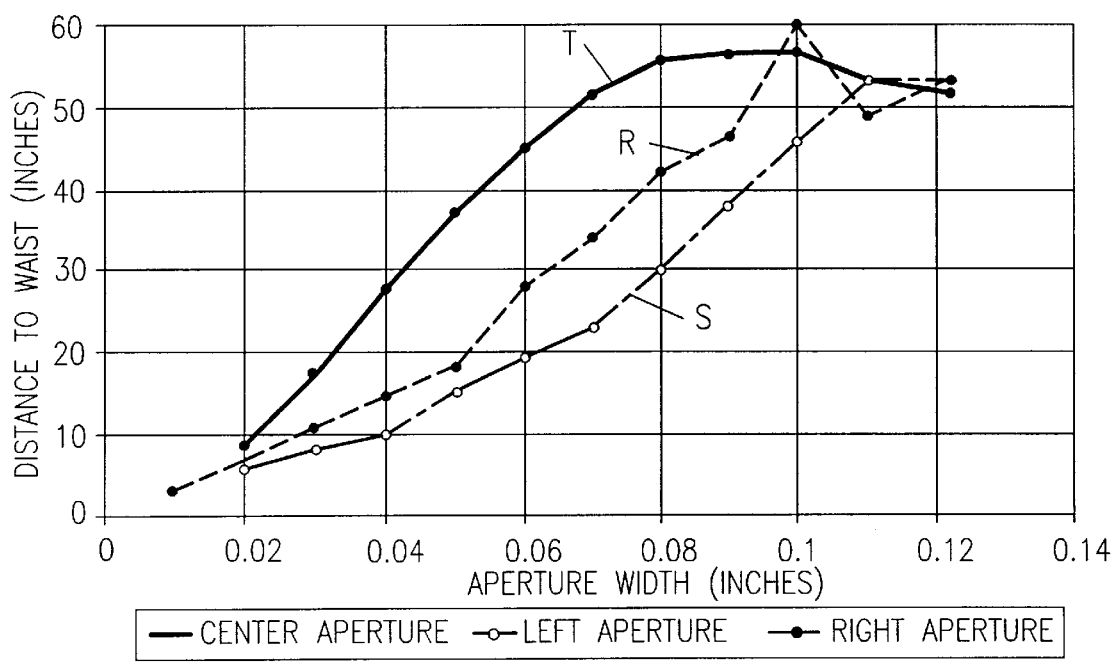
FIG. 27 is a graph illustrating a comparison of waist relocation of a sample beam apertured by an LCD gate device.

As the aperture width is reduced, the waist location shifts toward the lens because of diffraction effects. FIG. 27 is a graph of the waist location as a function of the aperture width comparing waist relocation of a sample beam apertured by an LCD gate device. Curve T illustrates the result of the gate opening being concentric or in the middle of the beam. Curve R illustrates the result of the gate opening being offset to the right side of the beam and Curve S illustrates the result of the gate opening being offset to the left side of the beam. The graph illustrates the superior aperturing performance of the gate opening being located on the left side of the beam providing a generally linear decrease in distance from the source to the waist location. The data in this graph corresponds to the waist diameter data in FIG. 26. The edge apertures work much better than the centered aperture for translating the width. When the centered aperture width is reduced, the distance does not change by very much until the aperture is on the order of 50% of the lens diameter. This phenomena is partly due to the sidelobes which are introduced. It may be noted that the turning point in waist diameter corresponds to the point where the waist begins to shift toward the lens.

Alternate aperture mechanisms may be designed for given applications. In FIGS. 2–5, the aperture mechanism 50 is configured from a plurality of longitudinal LCD panels 54, 56 with the width of the aperture (corresponding to the resolving axis) being incrementally varied by selective activation of the LCD panels 54, 56. The LCD regions may alternately be rectangular as shown in the previous embodiments or may alternately be circular, oval or any desired geometry or configuration to vary the waist location in two dimensions.

FIG. 8 illustrates such an alternate geometry for the aperture comprising LCD aperture mechanism 350 having a single circular LCD panel 356 defining a central aperture 352. The LCD panel 356 is connected to a controller (see FIG. 15 below) by suitable connection elements. By forming a round (or any other suitable shape) aperture 352, the spot size (i.e. at a given waist position) is controlled in both axes. For example as applied to a 2-D bar code, control of the focal point location would be provided in both the resolving and the non-resolving axis. The operation of the LCD aperture mechanism 350 is similar to that described of previous LCD aperture embodiments. This embodiment may be particularly applicable to grey-scaling techniques, described below, to provide a continuously variable or controllable waist position. The aperture mechanism 350 controls only a single aperture region by LCD region 356, but may alternately be comprised of a second or more circular LCD regions concentrically positioned relative to the first region.

Though the aperture regions may be incrementally activated to obtain discrete waist positions (discrete meaning that the change in waist position is incremental—similar to a step function), the LCD regions may be partially activated to block some, but not all of the light passing therethrough. Tests have shown that the beam waist position may be moved to any intermediate position between the near and far waist locations as defined by an inactive and fully active LCD aperture region. Using the methods similar to those used by portable computer manufacturers to generate continuously variable grey-scale on a liquid crystal display screen (by for example varying the applied voltage), the LCD aperture may be adjusted to a desired grey value thereby "setting" the beam waist at any selected intermediate location.

Figure 14:
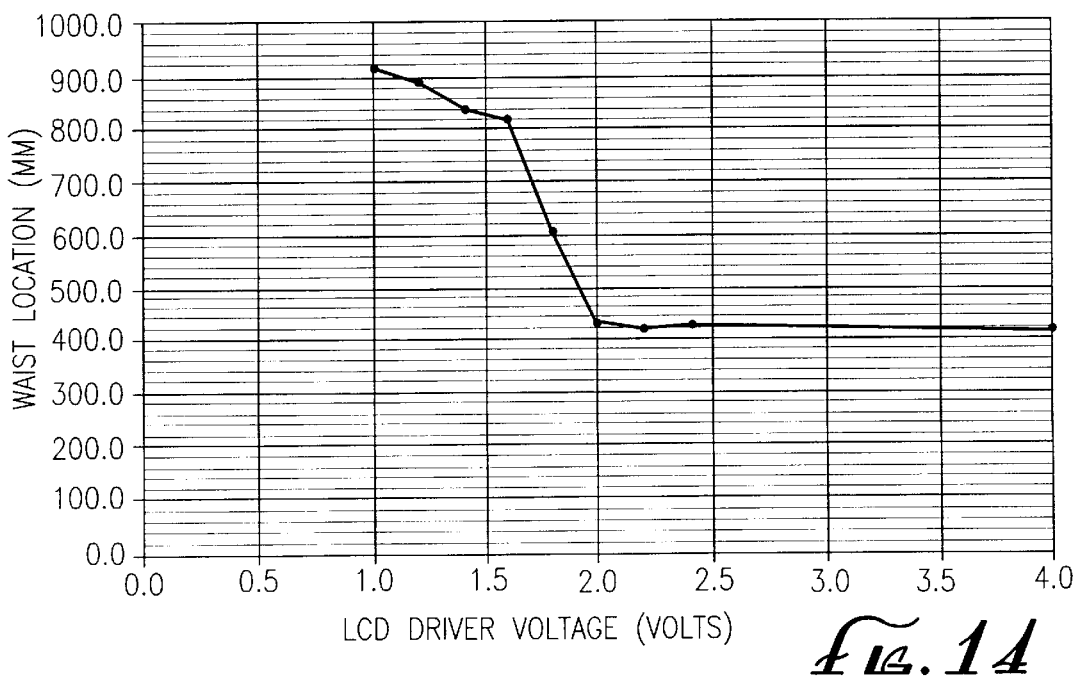
FIG. 14 a graph illustrating the shift in waist position as the LCD drive voltage is varied which changes the greyscale.

FIG. 14 is a graph illustrating results of a test where the shift in waist position by grey-scaling is controlled by varying the drive voltage applied on an LCD aperture device 250 such as that shown in FIG. 7. As the voltage applied to the LCD is varied, the percent activation of the LCD is adjusted from 0% to 100%. As shown in the graph, by increasing the voltage applied to the LCD from 0 to 2.0 volts, the waist location is moved from 910 mm to 410 mm from the aperture.

The grey-scale, continuously variable aperture technique therefore provides a continuously adjustable (or selectable) waist position. By selecting a given LCD activation level (such as by applying a given voltage to the LCD), any desired waist position within the range may be achieved. Such a continuous focus system has a variety of applications. One highly desirable application is automatic focus provided some sort of feedback is available. Distance measurement techniques such as an optical or ultrasonic (such as those employed by autofocus cameras) is one focus feedback method, but other methods may be employed such as focus error techniques may be employed. For example, optical sensors in the beam path may determine the scan distance and provide a signal to the aperture controller which may be used to select the desired aperture provided by the variable aperture mechanism. Alternately, the scan return signal may be observed (analog or digital) and then determined whether the symbol (e.g. the bar code) is being accurately reproduced. By sweeping through the range of available waist positions, it can be determined at what focal position provides the most successful scanning operation. A preferred adjustment algorithm is described below with reference to FIG. 28.

This waist location shift is a diffractive phenomena. The aperture size is smaller than the diffractive limit of the optical beam, i.e., the aperture impinges on the optical beam, enough so as to affect the beam propagation in accordance with diffraction theory. The phase and spatial intensity of the light wavefront at the variable aperture device is therefore being modified. In the case of the LCD, the spatial intensity is being modified. This phenomena can be used to alter the beam profile at a given location as well as move the waist location. Alternately, materials that change the optical phase of the wavefront when electrical or optical signals are applied to them (i.e. non-linear optical materials) may be used in place of the LCD. In these cases, selective regions may be activated and the wavefront phase be modified. This alternate structure may be designed to alter the waist location or change the beam profiles to allow improved performance. These materials are currently expensive but may prove economically viable in the future.

The LCD can be designed to form a wide variety of spatial intensity profiles. This technique can be extended to the situation of creating an Electronic Holographic Optical Element or Binary Optical Element. This element is an optical element that has no curvature, but has regions that are opaque which form a diffraction pattern that has an intensity profile suitable for resolving the bar code.

The edge of the aperture element may be designed to diffractively limit sidelobes in the beam profile by providing an edge which is irregular or not straight. FIG. 29 illustrates one possible construction of a non-straight, jagged edge for an aperture element 670 comprised of first set of liquid crystal panels 674, 676 defining an offset aperture 673. The first liquid crystal panel 674 is connected to a controller by connection elements 682 and 684. The second liquid crystal panel 676 is also connected to the controller by connection elements 682 and 684. The operation of the liquid crystal mechanism 670 is similar that described of previous LCD aperture embodiments. The non-straight edges 675, 677 of the elements 674, 676 allows interference between the edge contributors which may reduce sidelobes of the beam profile and improve performance. The aperture element 670 provides a second narrower width 672 by activating inner liquid crystal panel 678, the inner liquid crystal panel 676 is also being connected to the controller by connection elements 686 and 688. The inner liquid crystal panel also includes a jagged edge 679.

Figure 15:
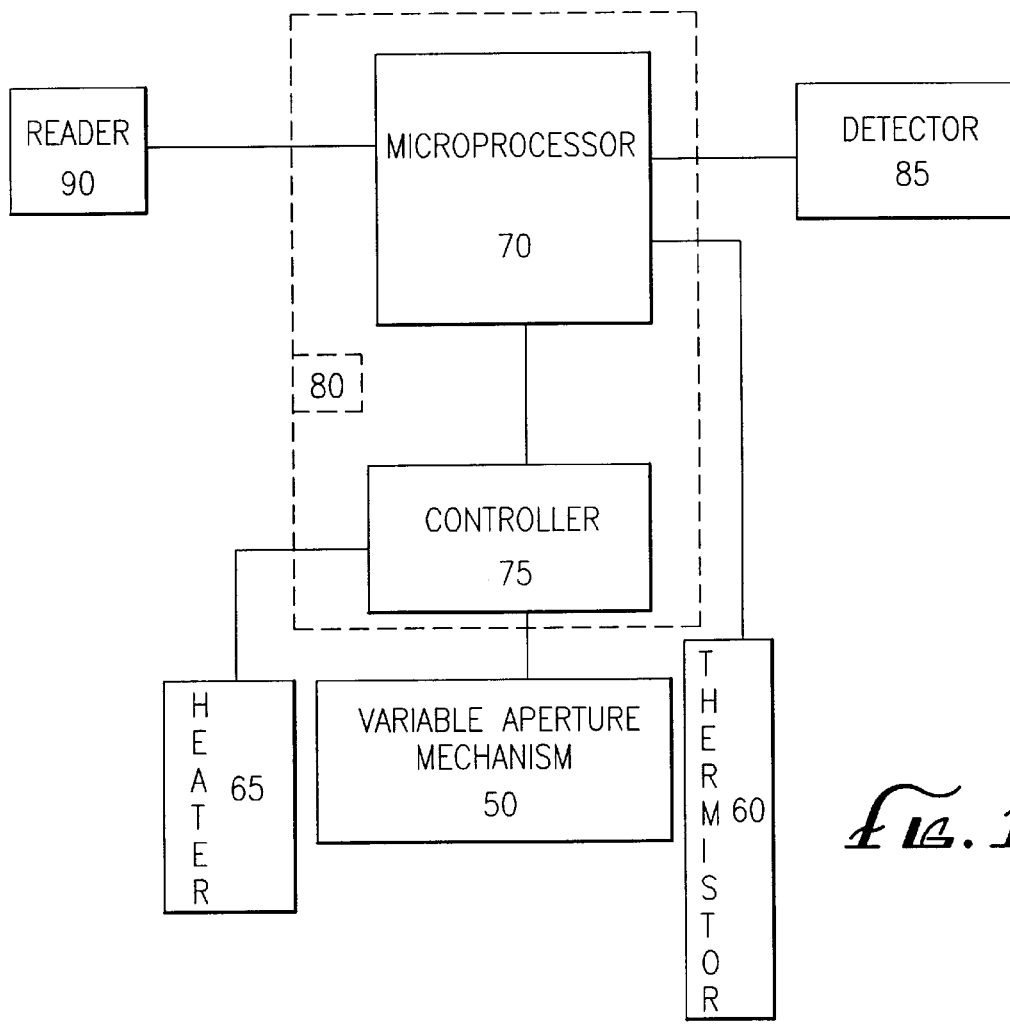
FIG. 15 diagrammatically illustrates a preferred control method for driving the LCD module.

FIG. 15 diagrammatically illustrates a preferred control method used to drive the LCD module (such as the variable aperture mechanism 50 of FIGS. 4–5) with a microprocessor 70 that is already present in the scanner. The microprocessor 70 signals the controller 75 (the two may be combined into a single microprocessor unit 80) to activate the LCD regions to the desired intensity. The microprocessor 70 is used to perform operations on the digital signal received from the detector 85 and prepare it to be sent to the reader 90 (such as a Portable Data Terminal which decodes the signal and sends it to a host computer). Since information such as wide-to-narrow ratios and number of digital transitions are calculated by the microprocessor 70, the information can be used to determine if the beam size is small enough (relative to the bar code size, for example) to resolve the smallest bars and spaces. The microprocessor 70 uses this information as feedback to adjust the waist location by increasing or decreasing the LCD activation level. Given the teachings herein, one skilled in the art could develop suitable software to optimize the system for a given application.

The response time of the liquid crystal material may be highly dependent upon temperature. For example, if the response time of the liquid crystal material is 10 msec at 20° C., it will increase to 100 msec at –20° C. The aperture mechanism may therefore be provided with a temperature measurement device shown in FIGS. 4–5 as a thermistor trace 60 placed on the glass substrate 51 adjacent the LCD panels 54, 56. The thermistor can also be placed elsewhere in the scanner as long as the ambient temperature is similar to that of the LCD. The system may then be controlled by monitoring the temperature and altering the operation for different temperatures. Referring again to FIG. 15, a signal from the thermistor 60 may be digitized and read by the microprocessor 70. The microprocessor 70 receives information from thermistor 60, and through suitable applications software, may control the way the LCD region of the aperture mechanism 50 is activated as a function of the temperature. For example, when sweeping or cycling across the focal range, the LCD regions may be activated for a longer period of time if the temperature is lower in order to accommodate for the increase LCD rise time.

Even without distinctly varying the LCD regions, the inherent rise and fall time for the LCD regions may allow for a sweep of LCD intensity from minimum to maximum. During the transition time, several scans may take place while the LCD intensity rises. During the change of intensity, grey-scaling occurs varying the beam waist from between the maximum and minimum distances.

To avoid temperature variation, the system may be provided with a heating element 65 in proximity to the aperture mechanism 50. The heating element may be controlled by a suitable thermostat, such as by controller 75 on the basis of the temperature detected by the thermistor 60.

In some scanners, the existing microprocessor may already have an $E^2PROM$ available for use. This $E^2PROM$ may also be used as a look-up table for LCD activation parameters in the temperature compensation control scheme or for some grey-scale control. For example, the voltage level required to establish a certain grey-scale will vary from unit to unit and over the operating temperature range. Discrete values for the voltage can be measured and input during the scanner manufacturing process and written into memory. For a given measured operating temperature, the look-up table would provide the information of a voltage correction which would compensate for temperature. This procedure may greatly simplify the electronics and improve performance over temperature range.

Figure 16:
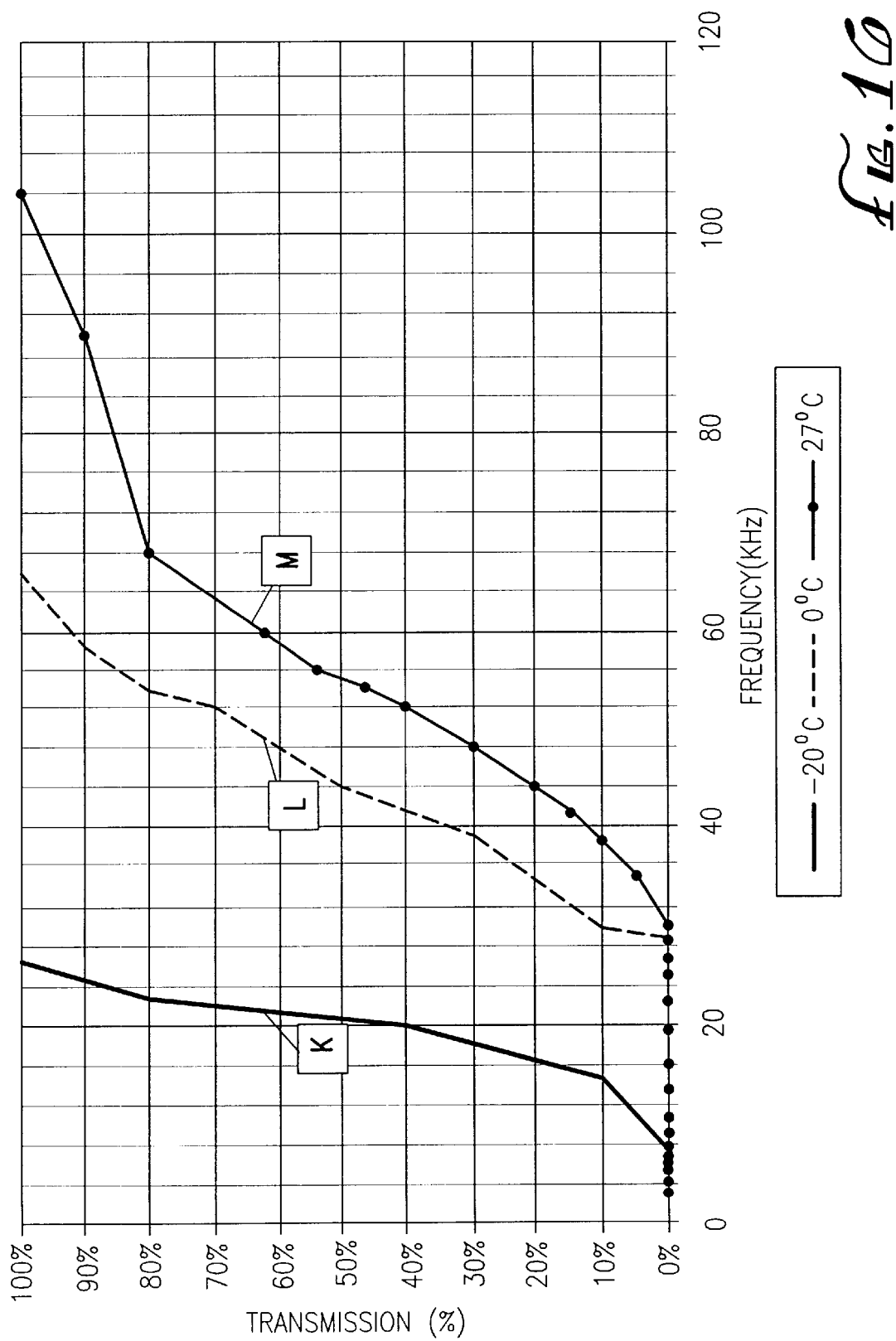
FIG. 16 a graph illustrating the frequency dependence of LCD grey-scaling for different temperatures.

Grey-scaling of the LCD regions may also be accomplished by driving the LCD regions at frequencies much higher than the normal operating frequency. FIG. 16 shows experimental data for one sample. As the frequency increases, the liquid crystal molecule alignment becomes less pronounced and the region blocks less light. As the temperature increases, the frequency limit also increases. In FIG. 16, curve K shown by a solid line illustrates how the transmission varies with frequency at a temperature of –20° C. Curve L shown by a dotted line illustrates how the transmission varies with frequency at a temperature of 0° C. Curve M shown by a dashed line illustrates how the transmission varies with frequency at a temperature of 20° C. Though it appears that a frequency controlled LCD is more sensitive to temperature fluctuation than voltage control, frequency control may be viable option since the microprocessor can readily change the drive frequency.

The voltage can be changed to establish a grey-scaling circuit by using an RC circuit with a time constant below the expected processor output frequency (10 kHz–30 kHz). By varying the drive frequency with the processor, the AC signal that is passed through the LCD will also vary. A higher frequency will yield a lower peak-to-peak voltage across the LCD and produce the desired grey-scale effect. Separate electronics can be used to convert the frequency or duty cycle output from the controller to a voltage level which controls the LCD drive voltage.

Alternately, the aperture size may be varied in the non-resolving axis to vary the waist location of the beam in the non-resolving axis (thereby controlling astigmatism). By controlling the beam waist position with an aperture device in the non-resolving axis, the spot size (at a given distance) in the direction perpendicular to the scan direction may be controlled. Depending upon the particular application, it may be desirable to control the spot size in the non-resolving axis, that is the axis perpendicular to the scanning plane. In certain symbols, such as printed bar codes (such as dot matrix printed codes), the lines may contain voids and the spaces may contain specks. If the scanning beam was focused to a fine point in all directions, the scanner may detect the void as a space or the specks as a bar producing a false read. For this reason, it may be desirable to produce an oval or elliptical shaped spot with a larger diameter in the non-resolving axis. The smaller diameter in the resolving axis allows resolution along the bars and spaces while the larger diameter in the non-resolving axis allows the spot being read to average out so that specks and voids do not cause a false read.

Figure 28:
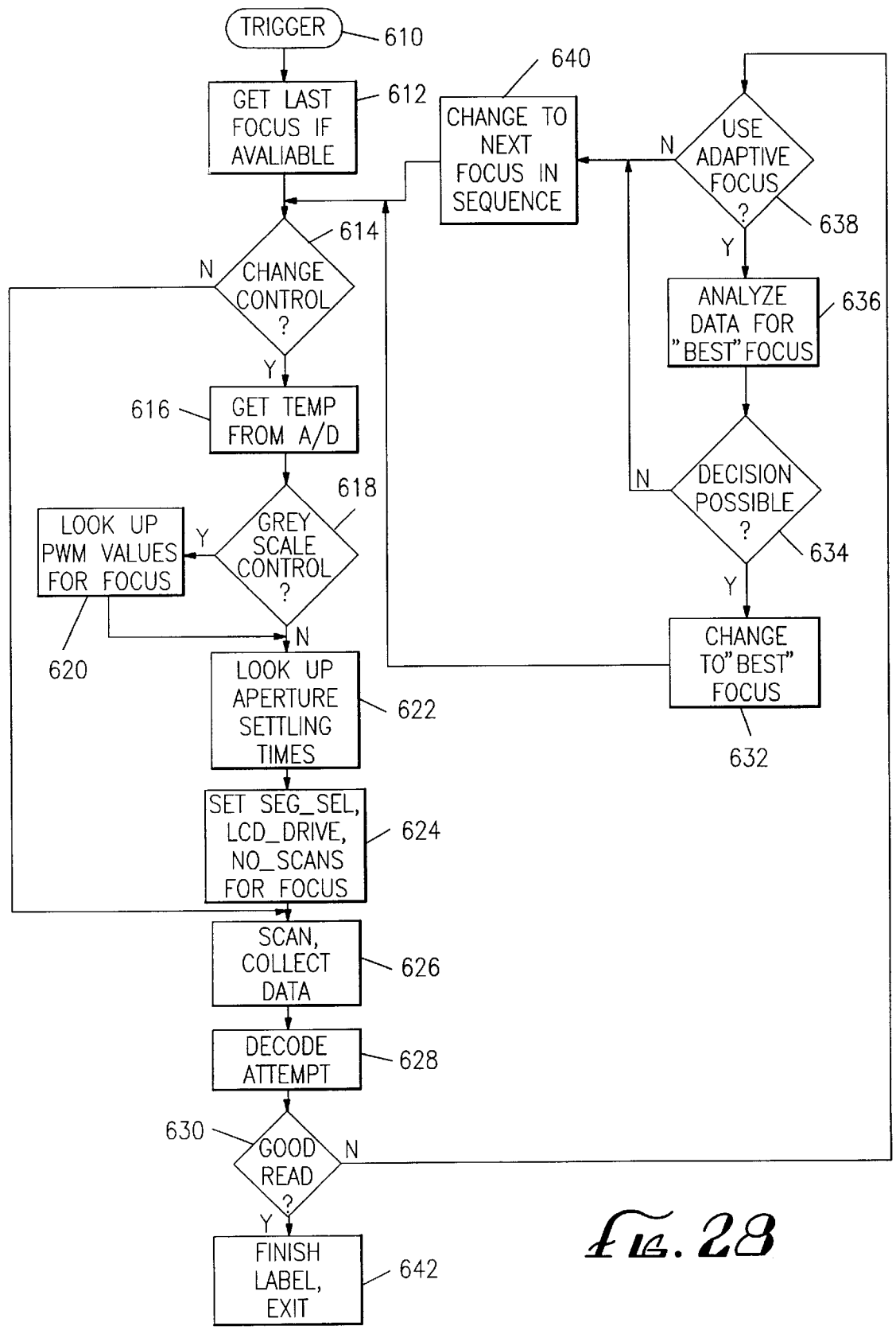
FIG. 28 is a flow chart representing a preferred focus adjustment method.

FIG. 28 is a flow chart illustrating a preferred LCD Activation Algorithm as it relates to an overall scanner system integration. When the scanner is activated by trigger 610, the Last "good read" LCD focus setting 612 is read if it is available otherwise a default focus position is chosen. The focus change controller 614 then determines, based on protocol, whether aperture temperature and settling time adjustment controls are to be implemented. If the adjustment controls are not to be implemented, the process skips to scanning step 626. If adjustment controls are implemented, the first adjustment step 616 is obtaining the temperature readout from the temperature device (such as thermistor 60 in FIG. 15). A grey scale controller 618 obtains an adjustment value from lookup table 620. Then the aperture settling times 622 are analyzed and the aperture adjustor 624 makes the required focus adjustments to compensate for temperature and settling effects. Once the adjustments have been completed, the scanner 626 performs the scan(s) and collects the data. The decoder 628 attempts to decode the scan detected and the gate 630 determines whether or not there was a successful read. If the read was successful, the program proceeds to exit 642, if unsuccessful, the gate 638 determines whether or not the adaptive focus routine is to be implemented. If the answer is "NO", changer 640 signals the LCD to change to the next focus position in sequence before returning to step 614. If the adaptive focus routine is implemented, the analyzer 636 processes the scan data and if possible determines in step 634 whether or not a best focus position can be ascertained. If best focus is determined, the setting sequencer 632 sets the focus to the best focus position before returning to step 614. If best focus cannot be determined, the changer 640 signals the LCD to change to the next focus position in sequence before returning to step 614.

Though the electrically actuable LCD aperture mechanism has many advantages, other aperture mechanism designs may be used. FIGS. 9A, 9B and 9C illustrate another alternate aperture comprising a rotating aperture device 450 comprising a plate 454 with a central rectangular aperture 452. The plate 454 is mounted to a center post 457 that is perpendicular to the optical axis. As the post is rotated, the projection of the aperture 452 along the optical axis becomes thinner until the effective clear aperture in the resolving axis is very small. In one test example with an aperture 452 having a width of 2.0 mm, the distance of the waist from the laser module moved from 1100 mm to 245 mm as the aperture was rotated from 0° to 75°. The waist diameter (along the resolving axis) changed from 610 microns to 436 microns. The system may therefore be designed to read at a maximum distance. By adding a small rotating aperture mechanism 450 in the beam path and selectively rotating the aperture 452 to only a few angle settings, the waist may be moved from the furthest distance to other intermediate distances. The scanner then sends the information to the decoder from all scan distances and the decoder then decodes whichever scans it can.

FIG. 10 illustrates another mechanical aperture comprising an aperture device 550 including a plate 554 with a round central aperture 552. The aperture device 550 may be similar to the iris of a camera, movable to an aperture diameter of a desired size. Providing a round aperture geometry, the iris type aperture device 550 will control waist location in two dimensions. Such an iris device may alternately may be designed to provide an oval or other shaped aperture.

FIG. 11 illustrates another mechanical aperture comprising a dual shutter aperture device 650 including a first pivoting shutter element 654a which oscillates on pivot rod 657a and second pivoting shutter element 654b which oscillates on pivot rod 657b. In tandem, the shutter elements 654a and 654b form a variable aperture 650. By controlling the motion of the shutter elements 654a and 654b, such as actuated by a motor operably connected to the rods 657a and 657b, the size of the aperture 652 may be selectively varied. In the illustrated embodiment, the shutter elements 654a and 654b rotate in the same direction when varying the aperture size. Alternately, if the initial position (from that illustrated) of one of the shutter elements were rotated 90°, the shutter elements would be rotated in opposite directions.

FIG. 12 illustrates another mechanical aperture comprising a dual panel aperture device 750 including a first sliding panel element 754a and a second sliding panel element 754b. The panel elements 754a and 754b move in tandem, both moving inwardly to reduce the size of the aperture 752 or moving outwardly to increase the size of the aperture 752. In tandem, the shutter elements 754a and 754b form a variable aperture 752. By controlling the motion of the shutter elements 654a and 654b, such as actuated by a motor mechanism operably connected to thereto, the size of the aperture 752 may be selectively varied.

Alternately, a system may include multiple aperture mechanisms, combining one or more of any of the above described aperture mechanisms (arranged in series for example) within a single system. For example, a system may include two LCD aperture mechanisms (such as a pair of the aperture device 50 of FIGS. 2–4) positioned in series in the beam path with one rectangular LCD aperture device arranged to control waist position in the resolving axis and the other rectangular LCD aperture device arranged to control waist position in the non-resolving axis. By providing them with independent control connection, such a dual aperture mechanism configuration permits independent control of waist position in both the resolving and the non-resolving axes. Of course the two aperture mechanisms could be controlled by a single signal and still modify waist position in both axes. Such a dual axis control system would be particularly useful in scanner applications which produces a raster scan pattern, such as certain fixed scanners.

Figure 17:
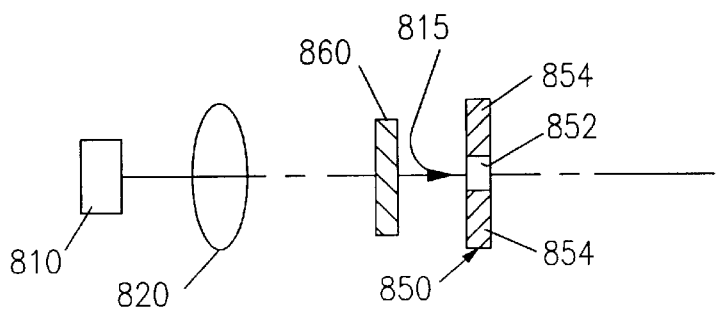
FIG. 17 is a schematic diagram of an alternate polarization adjustment system.

In another alternate embodiment, the amount of polarization of the incoming optical beam (i.e. the beam entering the aperture) may itself be adjusted. In this embodiment, the aperture mechanism may comprise an LCD (such as LCD aperture 250 in FIG. 7) or simply a sheet of polarized material having a central aperture of a configuration of the aperture 250 of FIG. 7 where the regions 256a and 256b are merely polarized material. By varying the polarization of the incoming optical beam and passing it through the polarized aperture, a grey-scale or incremental-type waist location adjustment may also be achieved. One such embodiment is shown in FIG. 17 in which the aperture mechanism 850 comprises a sheet of polarized material having a central aperture 852. The panels or bands 854, 854 (which be rectangular, round or some other shape) are polarized material. As the polarization of the incoming optical beam 815 entering the aperture mechanism 850 is varied, the amount of light passing through the panels 854 is adjusted creating the grey-scale waist adjustment. The polarization of the incoming light 15 may be adjusted in several ways. The light source 810 itself may be rotated about the axis of the beam 815 or may be electronically controlled (for example by varying power frequency) to adjust polarization. Alternately a polarization device 860 which adjusts the polarization of light as it passes therethrough, may be disposed upstream of the aperture mechanism 850. The device 860 may be a liquid crystal panel controllable by suitable means. Alternately the device 860 may be a simple sheet of polarized material which is rotatable about the axis of the beam 815 (in this instance a randomly polarized light source 810 is preferred for efficiency reasons). Alternately, the aperture mechanism 850 (preferably having a circular central aperture to be symmetric) may be rotated about the axis of the beam 815.

The variable aperture mechanism described herein may also be used in combination with other variable-focus techniques. Such techniques include for example (1) mechanical devices such as a focusing lens designed with an axially movable lens element to permit changing of the position of the focal point, (2) the rotatable optical polygon mirror device of U.S. Pat. No. 4,560,862 which has a plurality of facets, each mirror facet being of a different curvature, or (3) some actively changeable focusing optical element.

The variable aperture mechanism (which controls beam waist position) may also be used to improve "speed-to-read" i.e. the time it takes the scanner to perform a successful scan. When the aperture controlled system obtains a successful scan, it has the information as to what aperture setting was used to accomplish the successful scan. Since a particular user frequently will perform a number of similar tasks consecutively, the desired focus distance is likely to be nearly the same for consecutive scans. The control processor may then store information as to a particular user (it is of note that a checkout clerk typically inputs an employee number to the register) or alternately store recent successful scan distances. The processor may then select a preferred starting aperture setting, for example the setting at the most recent successful scan. If in fact the user is scanning an item at a similar distance to that of the previous item, time-to-read may be enhanced since the variable focus has an initial setting at a successful scan distance.

Thus, an optical system and method capable of variable and/or selectable focal planes have been shown and described. Though described with respect to a preferred embodiment of an optical scanning device such as a bar code scanner, the device may be employed by other focusing mechanisms such as those employed by data transfer devices (such as readers and encoders), particularly those using laser light such as laser printer and compact disc technologies. Though certain examples and advantages have been disclosed, further advantages and modifications may become obvious to one skilled in the art from the disclosures herein. The invention therefore is not to be limited except in the spirit of the claims that follow.

What is claimed is:

1. A method for obtaining a large depth of field in a scan volume for a data reader, comprising the steps of
    projecting an optical beam along an outgoing optical path;
    passing the optical beam through a control module;
    actively changing focus of the optical beam in the scan volume to selected distances from the data reader by electronic actuation without moving parts of the control module;
    collecting light from the optical beam reflecting and/or scattering off an object in the scan volume.

2. A method according to claim 1 further comprising forming the optical beam from a laser diode and positioning the control module on a side of the focusing system opposite to the laser diode.

3. A method according to claim 1 further comprising
    forming the beam of light from a laser diode;
    focusing the beam with a focusing system; and
    positioning the control module upstream of the focusing system and adjacent thereto.

4. A method according to claim 1 further comprising
    forming the optical beam from a laser diode;
    focusing the optical beam to a given waist location with a fixed focusing lens system; and
    wherein the step of actively focusing the optical beam comprises passing the optical beam through an LCD mechanism of the control module.

5. A method according to claim 1 further comprising lowering amplitude of the optical beam in the scan volume corresponding to focus being changed to a distance nearer to the data reader.

6. A method according to claim 1 further comprising maintaining a relatively constant waist diameter while changing focus of the optical beam.

7. A method for data reading comprising the steps of
    projecting an optical beam along an outgoing optical path;
    passing the optical beam through a control module;
    actively focusing the optical beam to selected distances from the data reader by electronic actuation without moving parts of the control module;
    forming the optical beam from a laser diode;
    focusing the beam with a focusing system; and
    positioning the control module downstream of the focusing system.

8. A method for data reading comprising the steps of
    projecting an optical beam along an outgoing optical path;
    passing the optical beam through a control module;
    actively focusing the optical beam to selected distances from the data reader by electronic actuation without moving parts of the control module;
    forming the beam from a laser diode;
    focusing the beam with a focusing system;
    scanning the beam that has been focused with a scanning mechanism; and
    positioning the control module between the focusing system and the scanning mechanism.

9. A method for data reading comprising the steps of
    projecting an optical beam along an outgoing optical path;
    passing the optical beam through a control module;
    actively focusing the optical beam to selected distances from the data reader by electronic actuation without moving parts of the control module;
    forming the beam from a laser diode;
    focusing the beam with a focusing system; and
    positioning the control module downstream from the laser diode beyond a point one system focal length upstream of the focusing system.

10. A method for data reading comprising the steps of
    projecting an optical beam along an outgoing optical path;
    passing the optical beam through a control module;
    actively focusing the optical beam to selected distances from the data reader by electronic actuation without moving parts of the control module;
    compensating for temperature fluctuation.

11. A method for data reading according to claim 10 wherein the step of compensating for temperature fluctuation comprises the steps of
    obtaining a temperature readout from a temperature device,
    calculating a focus adjustment based upon the temperature readout obtained,
    making the focus adjustment on the control module.

12. A laser scanner for bar code reading, comprising:
    a discrete light source generating an optical beam along an outgoing optical path;
    a focusing lens positioned in the outgoing optical path for focusing the optical beam to a waist at a given distance;
    an electronically actuable aperture mechanism having no moving parts and positioned in the outgoing optical path, for adjusting distance of the waist from the light source.

13. A laser scanner according to claim 12 wherein the aperture mechanism is positioned in the outgoing optical path at a position downstream from one focal length upstream of the focusing lens.

14. A scanner comprising:
a discrete light source generating an optical beam along an outgoing optical path;
a focusing lens positioned in the outgoing optical path for focusing the optical beam to a waist at a given location;
an electronically actuable aperture mechanism having no moving parts and positioned in the outgoing optical path, for adjusting location of the waist;
a scanning mechanism positioned downstream of the focusing lens for scanning the outgoing optical beam, wherein the aperture mechanism is positioned between the focusing lens and the scanning mechanism.

15. A data reading device, comprising:
a light source generating a laser beam along an outgoing optical path;
a focusing optical element positioned in the outgoing optical path for focusing the laser beam to a waist at a given distance from the light source;
a diffractive device positioned in the outgoing optical path, the diffractive device comprising at least a first panel, the first panel being partially light transmissive, the diffractive device moving the waist nearer to the light source dependent upon degree of transmissivity of the first panel.

16. A data reading device according to claim 15 wherein the first panel forms a circular aperture.

17. A data reading device according to claim 15 wherein the first panel forms a rectangular aperture.

18. A data reading device according to claim 15 wherein the light source comprises a laser diode.

19. A data reading device according to claim 15 wherein the focusing optical element comprises a lens.

20. A data reading device comprising:
a light source generating a laser beam along an outgoing optical path;
a focusing optical element positioned in the outgoing optical path for focusing the laser beam to a waist at a given location;
a diffractive device positioned in the outgoing optical path, the diffractive device comprising at least a first panel, the first panel being partially light transmissive;
a second panel for forming an aperture between the first and second panels.

21. A data reading device according to claim 20 wherein the aperture is rectangular.

22. A data reading device according to claim 20 wherein both the first and second panels are partially light transmissive.

23. A data reading device according to claim 20 wherein both the first and second panels comprise electrically actuated liquid crystal devices.

24. A data reading device comprising:
a light source generating a laser beam along an outgoing optical path;
a focusing optical element positioned in the outgoing optical path for focusing the laser beam to a waist at a given location;
a diffractive device positioned in the outgoing optical path, the diffractive device comprising at least a first panel, the first panel being partially light transmissive, wherein the diffractive device refocuses the laser beam to waist at a new location nearer to the light source than the given location.

25. An optical system for data reading, comprising
a light source generating an optical beam along an outgoing optical path toward an object to be read;
a focusing system positioned in the outgoing optical path for focusing the optical beam to a given distance;
an aperture device positioned in the outgoing optical path, the aperture device forming an opening which is offset from a center of the outgoing beam.

26. An optical system according to claim 25 wherein the aperture device includes a section which is partially light transmissive.

27. An optical system according to claim 25 wherein the aperture device refocuses the laser beam to waist at a new location nearer to the light source than the given location.

28. A data reader, comprising:
a light source generating an optical beam along an outgoing optical path;
a focusing lens positioned in the outgoing optical path for focusing the optical beam to a waist at a given distance from the lens in a scan volume;
an electronically-operated focusing control module positioned in the outgoing optical path, the control module adjusting distance of the waist from the light source onto an object in the scan volume without use of moving parts;
a detector for detecting light from the optical beam reflecting off the object.

29. A data reader according to claim 28 wherein the control module includes a diffractive optical element positioned in the outgoing optical path at a position downstream from one focal length upstream of the focusing lens.

30. A data reader according to claim 28 wherein the data reader comprises a laser bar code scanner.

31. A data reader according to claim 28 wherein the control module comprises an diffractive aperture device including at least one LCD panel for forming an aperture along at least one optical axis of the outgoing optical beam.

32. A data reader comprising
a light source generating an optical beam along an outgoing optical path;
a focusing lens positioned in the outgoing optical path for focusing the optical beam to a waist at a given location;
an electronically-operated focusing control module positioned in the outgoing optical path, the control module adjusting location of the waist without use of moving parts wherein the control module includes a diffractive optical element positioned in the outgoing optical path;
a scanning mechanism positioned downstream of the focusing lens for scanning the outgoing optical beam, wherein the diffractive optical element is positioned between the focusing lens and the scanning mechanism.

33. A data reader, comprising:
a light source generating an optical beam along an outgoing optical path;
a focusing lens positioned in the outgoing optical path for focusing the optical beam to a waist at a given location;
an electronically-operated focusing control module positioned in the outgoing optical path, the control module including a temperature sensor and a controller for adjusting focusing of the control module according to temperature in the control module as sensed by the temperature sensor.

* * * * *